(12) United States Patent
Mahan et al.

(10) Patent No.: US 9,311,425 B2
(45) Date of Patent: Apr. 12, 2016

(54) RENDERING A PAGE USING A PREVIOUSLY STORED DOM ASSOCIATED WITH A DIFFERENT PAGE

(75) Inventors: Michael P. Mahan, San Diego, CA (US); Chetan S. Dhillon, San Diego, CA (US); Wendell Ruotsi, Portland, OR (US); Vikram Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 12/730,967

(22) Filed: Mar. 24, 2010

(65) Prior Publication Data

US 2010/0262780 A1 Oct. 14, 2010

Related U.S. Application Data

(60) Provisional application No. 61/248,909, filed on Oct. 6, 2009, provisional application No. 61/165,238, filed on Mar. 31, 2009.

(51) Int. Cl.
*G06F 17/00* (2006.01)
*G06F 17/30* (2006.01)
(Continued)

(52) U.S. Cl.
CPC .......... *G06F 17/30902* (2013.01); *G06F 15/16* (2013.01); *G06F 15/167* (2013.01)

(58) Field of Classification Search
CPC .. G06F 15/16; G06F 17/30902; G06F 15/167
USPC ...................... 715/234; 707/E17.12; 709/203
See application file for complete search history.

(56) References Cited

U.S. PATENT DOCUMENTS 6,377,957 B1 * 4/2002 Jeyaraman .................... 707/625
6,397,217 B1 5/2002 Melbin
(Continued)

FOREIGN PATENT DOCUMENTS

CN 101019114 A 8/2007
EP 1406183 A2 4/2004
(Continued)

OTHER PUBLICATIONS

Ali Mesbah, et al., "Migrating Multi-page Web Applications to Single-page AJAX Interfaces", Software Maintenance and Reengineering, 2007. CSMR '07. 11th Euro Pean Conference on, IEEE, PI, Mar. 1, 2007, pp. 181-190, XP031070581, ISBN: 978-0-7695-2802-1 p. 181-p. 183.
(Continued)

*Primary Examiner* — Mohammed-Ibrahim Zuberi
(74) *Attorney, Agent, or Firm* — Shirin Tefagh

(57) ABSTRACT

Aspects relate to apparatus and methods for rendering a page on a computing device, such as a web page. The apparatus and methods include receiving a request for a requested instance of a page and determining if the requested instance of the page corresponds to a document object model (DOM) for the page stored in a memory. Further, the apparatus and methods include retrieving a dynamic portion of the DOM corresponding to the requested instance if the requested instance of the page corresponds to the DOM stored in the memory. The dynamic portion may be unique to the requested instance of the page. Moreover, the apparatus and methods include storing the dynamic portion of the DOM corresponding to the requested instance of the page in a relationship with the static portion of the DOM.

47 Claims, 14 Drawing Sheets

(51) Int. Cl.
*G06F 15/16* (2006.01)
*G06F 15/167* (2006.01)

(56) References Cited

U.S. PATENT DOCUMENTS

| | | | |
|---|---|---|---|
| 6,606,525 B1* | 8/2003 | Muthuswamy et al. | 700/52 |
| 6,635,089 B1* | 10/2003 | Burkett et al. | 715/235 |
| 6,826,726 B2* | 11/2004 | Hsing et al. | 715/234 |
| 6,976,211 B2* | 12/2005 | Lection et al. | 715/234 |
| 7,047,318 B1* | 5/2006 | Svedloff | 709/246 |
| 7,100,112 B1* | 8/2006 | Winser | 715/210 |
| 7,386,786 B2 | 6/2008 | Davis et al. | |
| 7,403,951 B2 | 7/2008 | Setlur et al. | |
| 7,584,417 B2* | 9/2009 | Friend et al. | 715/224 |
| 7,594,001 B1* | 9/2009 | Ebbo et al. | 709/219 |
| 7,624,160 B2* | 11/2009 | Henderson et al. | 709/219 |
| 7,660,950 B2* | 2/2010 | Miller et al. | 711/133 |
| 7,739,657 B2* | 6/2010 | Rolfs | 717/106 |
| 7,870,502 B2 | 1/2011 | Rogers et al. | |
| 8,037,081 B2 | 10/2011 | Douglis et al. | |
| 8,055,685 B2 | 11/2011 | Timmons | |
| 8,250,457 B2* | 8/2012 | Fainberg et al. | 715/205 |
| 2002/0004813 A1* | 1/2002 | Agrawal et al. | 709/201 |
| 2002/0133627 A1 | 9/2002 | Maes et al. | |
| 2002/0184264 A1* | 12/2002 | Berg et al. | 707/513 |
| 2002/0194388 A1* | 12/2002 | Boloker et al. | 709/310 |
| 2003/0001893 A1* | 1/2003 | Haley | 345/762 |
| 2003/0025728 A1* | 2/2003 | Ebbo et al. | 345/744 |
| 2003/0046365 A1* | 3/2003 | Pfister et al. | 709/219 |
| 2003/0189593 A1* | 10/2003 | Yarvin | 345/762 |
| 2003/0217169 A1 | 11/2003 | James et al. | |
| 2004/0123236 A1* | 6/2004 | Cheung | 715/513 |
| 2004/0123239 A1* | 6/2004 | Roessler | 715/513 |
| 2004/0168122 A1 | 8/2004 | Kobipalayam Murugaiyan | |
| 2006/0064636 A1* | 3/2006 | Hua et al. | 715/526 |
| 2006/0129635 A1* | 6/2006 | Baccou et al. | 709/203 |
| 2006/0136371 A1* | 6/2006 | Yuan et al. | 707/2 |
| 2006/0200535 A1* | 9/2006 | Moser | 709/217 |
| 2007/0240041 A1 | 10/2007 | Pearson | |
| 2009/0037517 A1* | 2/2009 | Frei | 709/202 |
| 2009/0063500 A1 | 3/2009 | Zhai et al. | |
| 2010/0005053 A1 | 1/2010 | Estes | |
| 2010/0017696 A1* | 1/2010 | Choudhary et al. | 715/205 |
| 2010/0268773 A1 | 10/2010 | Hunt et al. | |
| 2011/0029641 A1* | 2/2011 | Fainberg et al. | 709/219 |
| 2011/0258532 A1 | 10/2011 | Ceze et al. | |
| 2012/0226972 A1* | 9/2012 | Fainberg et al. | 715/234 |
| 2012/0303697 A1* | 11/2012 | Alstad | 709/203 |

FOREIGN PATENT DOCUMENTS

| | | |
|---|---|---|
| JP | 2005215950 A | 8/2005 |
| JP | 2006031476 A | 2/2006 |
| JP | 2007536655 A | 12/2007 |
| JP | 2009508220 A | 2/2009 |
| WO | 2005106710 A1 | 11/2005 |

OTHER PUBLICATIONS

International Search Report and Written Opinion—PCT/US2010/029124, International Search Authority—European Patent Office—Dec. 1, 2010.

Zhang, et al., "Smart caching for web browsers," WWW 2010, Full Paper, Apr. 26-30, 2011, Raleigh, NC, USA, pp. 491-500.

Mesbah A., et al., "Migrating Multi-page Web Applications to Single-page AJAX Interfaces", Software Maintenance and Reengineering, 2007. CSMR '07. 11th Euro Pean Conference on, IEEE, PI, Mar. 1, 2007, pp. 181-190, XP031070581, ISBN: 978-0-7695-2802-1 p. 181-183.

Zhang K., et al., "Smart caching for web browsers," WWW 2010, Full Paper, Apr. 26-30, 2011, Raleigh, NC, USA, pp. 491-500.

Ramaswamy L ., et al., "Automatic Fragment Detection in Dynamic Web Pages and its Impact on Caching", IEEE Transactions on Knowledge and Data Engineering, vol. 17, No. 6, Jun. 2005, pp. 859-874.

* cited by examiner

RENDERING A PAGE USING A PREVIOUSLY STORED DOM ASSOCIATED WITH A DIFFERENT PAGE

CLAIM OF PRIORITY UNDER 35 U.S.C. §119

The present Application for Patent claims priority to Provisional Application No. 61/248,909 entitled "Apparatus and Methods of Rendering a Page" filed Oct. 6, 2009, and assigned to the assignee hereof and hereby expressly incorporated by reference herein, and claims priority to Provisional Application No. 61/165,238 entitled "Method and Apparatus for Facilitating Efficient Local Caching" filed Mar. 31, 2009, and assigned to the assignee hereof and hereby expressly incorporated by reference herein

BACKGROUND

The following description relates generally to computing device communications, and more particularly to apparatus and methods of rendering a page.

A rendering of a page, such as a web page, on a computing device is affected by a document object model (DOM) tree of the page. The DOM tree defines one or more nodes in child-parent relationship, including properties and/or attributes of the respective DOM node and its style attributes. When a page is launched, its .html files are read from a cache, parsed, a DOM tree is constructed and then embedded or an external cascading style sheet (css) is applied. These operations are performed every time a page is loaded and takes a significant amount of time, thereby leading to a less than satisfactory user experience.

Moreover, this amount of time is exacerbated in a resource-constrained environment, such as with a mobile computing device, e.g. a mobile phone, personal digital assistant (PDA) or other relatively small, portable devices having relatively limited processing capability, memory, and/or communications throughput when compared to a non-mobile computing device. Thus, the user experience suffers even more with a mobile computing device.

Therefore, improvements in rendering of a page are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for rendering a page on a computer device. The method may include receiving, at a computer device, a request for a requested instance of a page. In addition, the method may include determining if the requested instance of the page corresponds to a document object model (DOM) for the page stored in a memory. The DOM stored in memory corresponds to a stored instance of the page and comprises a static portion that is the same for both the stored instance and the requested instance of the page. Further, the method may also include retrieving a dynamic portion of the DOM corresponding to the requested instance if the requested instance of the page corresponds to the DOM stored in the memory. The dynamic portion is unique to the requested instance of the page. Moreover, the method may include storing the dynamic portion of the DOM corresponding to the requested instance of the page in a relationship with the static portion of the DOM.

Another aspect relates to at least one processor configured to render a page on a computer device. The processor may include a first module for receiving, at a computer device, a request for a requested instance of a page. The processor may also include a second module for determining if the requested instance of the page corresponds to a document object model (DOM) for the page stored in a memory. The DOM stored in memory corresponds to a stored instance of the page and comprises a static portion that is the same for both the stored instance and the requested instance of the page. In addition, the processor may include a third module for retrieving a dynamic portion of the DOM corresponding to the requested instance if the requested instance of the page corresponds to the DOM stored in the memory. The dynamic portion is unique to the requested instance of the page. The processor may also include a fourth module for storing the dynamic portion of the DOM corresponding to the requested instance of the page in a relationship with the static portion of the DOM.

Yet another aspect relates to a computer program product for rendering a page on a computer device. The computer program product may include a computer-readable medium including at least one instruction for causing the computer device to receive a request for a requested instance of a page. The computer-readable medium may also include at least one instruction for causing the computer device to determine if the requested instance of the page corresponds to a document object model (DOM) for the page stored in a memory. The DOM stored in memory corresponds to a stored instance of the page and comprises a static portion that is the same for both the stored instance and the requested instance of the page. The computer-readable medium may further include at least one instruction for causing the computer device to retrieve a dynamic portion of the DOM corresponding to the requested instance if the requested instance of the page corresponds to the DOM stored in the memory. The dynamic portion is unique to the requested instance of the page. Moreover, the computer-readable medium may also include at least one instruction for causing the computer device to store the dynamic portion of the DOM corresponding to the requested instance of the page in a relationship with the static portion of the DOM.

Another aspect relates to an apparatus. The apparatus may include means for receiving, at a computer device, a request for a requested instance of a page. In addition, the apparatus may include means for determining if the requested instance of the page corresponds to a document object model (DOM) for the page stored in a memory. The DOM stored in memory corresponds to a stored instance of the page and comprises a static portion that is the same for both the stored instance and the requested instance of the page. The apparatus may also include means for retrieving a dynamic portion of the DOM corresponding to the requested instance if the requested instance of the page corresponds to the DOM stored in the memory. The dynamic portion is unique to the requested instance of the page. The apparatus may further include means for storing the dynamic portion of the DOM corresponding to the requested instance of the page in a relationship with the static portion of the DOM.

Still another aspect relates to an apparatus for rendering a page on a computer device. The apparatus may include a portal component configured to receive a request for a requested instance of a page. The apparatus may also include a web component configured to determine if the requested instance of the page corresponds to a document object model (DOM) for the page stored in a memory. The DOM stored in memory corresponds to a stored instance of the page and comprises a static portion that is the same for both the stored instance and the requested instance of the page. Additionally, the apparatus may include the web component configured to retrieve a dynamic portion of the DOM corresponding to the requested instance if the requested instance of the page corresponds to the DOM stored in the memory. The dynamic portion is unique to the requested instance of the page. The apparatus may further include the web component configured to store the dynamic portion of the DOM corresponding to the requested instance of the page in a relationship with the static portion of the DOM.

The described aspects relate to a method, apparatus or computer program product for rendering a page on a computer device, comprising actions, means for or instructions for receiving, at a computer device, a request for a requested instance of a page; determining if the requested instance of the page corresponds to a document object model (DOM) for the page stored in a memory, wherein the DOM stored in memory corresponds to a stored instance of the page and comprises a static portion that is the same for both the stored instance and the requested instance of the page; retrieving a dynamic portion of the DOM corresponding to the requested instance if the requested instance of the page corresponds to the DOM stored in the memory, wherein the dynamic portion is unique to the requested instance of the page; and storing the dynamic portion of the DOM corresponding to the requested instance of the page in a relationship with the static portion of the DOM, and, optionally, for rendering the requested instance of the page according to the static portion of the DOM and the dynamic portion of the DOM corresponding to the requested instance of the page.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
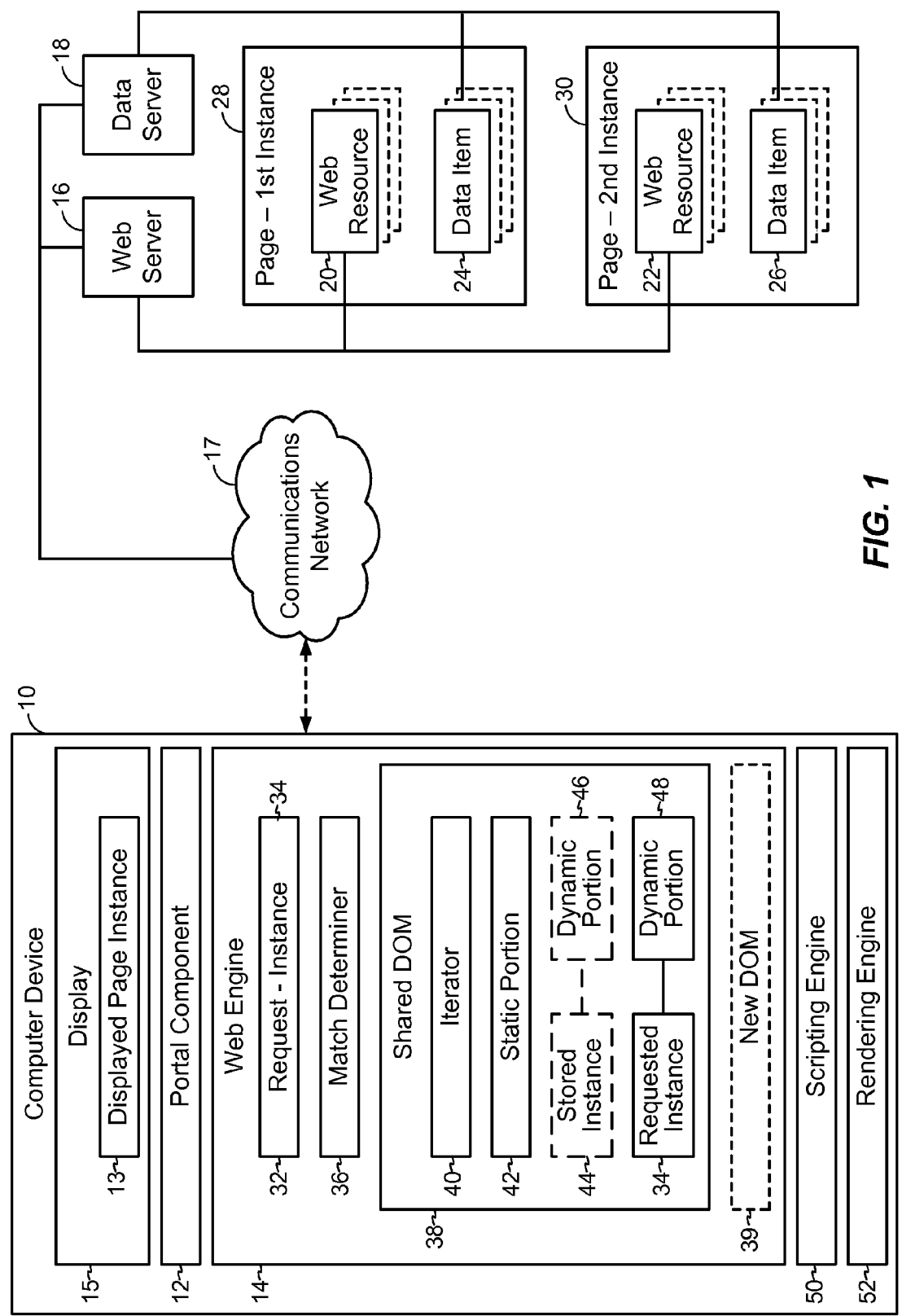
FIG. 1 is a schematic diagram of an aspect of a system for rendering a page.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to fetching and rendering a page, such as a web page having web resources and data items. In addition, the described aspects provide a virtual effect of transitioning between web pages, e.g., providing links for a user to move forward and backward between web pages. The web page is rendered according to a corresponding document object model (DOM), which defines the components, relative structure, and behavior of the respective components that define the page. Different instances of the same page may share some common portions of the DOM, while having other unique portions that differentiate one instance over the next instance of the page.

According to one or more aspects, apparatus and methods of rendering a page provide a web engine or other components operable to create a shared DOM that may be used by two or more instances of the page. The shared DOM includes a static DOM portion that is common to the different instances of a page, and one or more dynamic DOM portions that are unique to respective instances of the page. As such, the described aspects improve efficiency in page rendering by reusing the static DOM portion in rendering a new instance of a page that corresponds to a stored or cached DOM, which can be based on a previously processed, different instance of the same page, thereby avoiding having to create an entirely new DOM for each instance of the page.

For example, these aspects may be described with reference to a use case such as a mobile shopping application executed by a mobile phone. It should be understood, however, that this example use case is for illustration only, and that many other use cases exist. In the mobile shopping application example, web pages corresponding to the mobile shopping application may include a tree or hierarchy of different types of pages, such as a main page having a catalog listing, one or more catalog pages having item listings and/or other catalog listings, and one or more item detail pages, which may also link to other item detail pages, and/or additional detail pages such as pricing or purchasing pages. Different instances of the same page, such as an item detail page for a first game and an item detail page for a second game, may share similar structure and possibly some similar data, but they may also each have unique data, such as a name of each respective game. As such, typically, each item detail page has a different, corresponding DOM. In the present aspects, however, the item detail pages instead have a shared DOM that includes a static DOM portion corresponding to common DOM elements between the different instances of the page, and one or more dynamic DOM portions that associate the unique data items with the respective instance of the page. For example, in this case, the static DOM portion may comprise a same layout of the first game item detail page and the second game item detail page, while the dynamic data items, such as the first game name and the second game name, are represented by a dynamic DOM portion.

In other words, in one aspect, when a unique instance of a page (for example, an "itemdetail" page) has never been fetched or cached on a computer device, and that instance of the page is requested, the described aspects provide a behavior that results in fetching the page data (for example, including the hyper text markup language (html) or extensible html (xhtml), cascading sheet style (css), and javascript (js)) and creating a static portion of a document object model (DOM) from the xhtml and css. This static portion of the DOM is stored in cache and can be reused. For that page, the js is then executed, resulting in one or more data requests (for example, an XMLHttpRequest (XHR)). The initial js and the handling of each of the one or more responses results in the creating of one or more dynamic portions of the DOM for that instance of the page. Then, when a second instance of the page is requested, the static DOM portion can be reused, and the js is executed for the new query string of the request corresponding to the second instance of the page, resulting in one or more new data requests and the creating of one or more dynamic portions of the DOM for the new instance of the page. As a result, the shared DOM includes at least one static portion and one or more dynamic portions, enabling the DOM to define a shared DOM for use in rendering different instances of the page.

Accordingly, in an aspect, reuse of the initial or static state or portions of the DOM reduces page transitioning time. In one or more aspects, state or DOM portion reuse may be achieved by maintaining separate, or alternatively integrated, data structures corresponding to the static and dynamic states or portions of the DOM.

Further, in one or more aspects, one or more advantages may include: no or low memory overhead, as only a table of properties are copied; fast loading of the page, as only one time parsing of HTML and applying of CSS rules occurs; cleaner and less complex code as compared to other implementations, as different DOMs do not need to be created for different instances of the same page; no extra walk through the DOM tree, as the rendering can focus on updating the dynamic DOM portions considering the static DOM portions do not change; and dynamic properties are created on demand on a page load and are removed on an existing walk through the DOM on navigating back to an instance of the page.

Optionally, in some aspects, the DOM and corresponding page content may be cached, and the cache may include a derivative cache or a structured cache. The derivative cache may store content derived from received content. For example, in one aspect, upon receipt of raw content, such as but not limited to xhtml, cascading sheet styles or javascript, the computer device may further process the raw content to generate derivative content. For instance, in an aspect, it should be appreciated that the derivative content may include the static portion of the DOM, e.g., the static portion of the DOM may be created and/or derived from the received xhtml and css. It may be determined to store the derivative content, for example, in the derivative cache, as the resources expended to generate derivative content are relatively expensive. In one aspect, this caching of derivative content may assist in efficiently facilitating subsequent usage of the cached content through the use of this pre-prepared, derivative content, such as if the content is used frequently.

Another example of derivative content may include the computer device fetching a program to be run when it is retrieved from cache. Rather than compiling the fetched program every time computer device retrieves the program from the cache, the computer device may compile the program. The compiled program, or derivative content, may be stored in the derivative cache, ready for subsequent use. Additionally, the derivative content may be associated with the received source.

In another aspect, computer device cache may further include a structured cache. The structured cache allows for storage of content in a manner such that retrieving programs or the like may selectively choose useful portions of the cached content for retrieval. For example, without the present apparatus and methods, the cached content may appear as semantically opaque content, thereby prohibiting selective retrieval of portions of the cached content. In one aspect, the structured cache can be organized in such a way as to allow selected known portions of a content item stored in the structured cache to be retrieved without requiring retrieval of the entire content item.

For example, assume content with a well known structure, such as java script object notation (JSON) content, is stored in the structured cache. Further assume a program or the like may only use a small portion of the JSON content, such as content associated with the manufacturer, the title, or the like. The structured cache allows for the selective removal of only the portion of the content useful to the program, thereby reducing any intermediary processing that may have been required.

In another example, a content provider may introduce origin-server generated entry points with content transmitted to the computer device. As such, when content with origin-server generated entry points is stored in a structured cache, subsequent removal of portions defined by the entry points may be facilitated.

Optionally, in some aspects, the described apparatus and methods may further include pre-fetching operations that can be performed to fetch and process a page prior to receipt of a request for that page.

Optionally, in some aspects, the described apparatus and methods may further include pre-derivation operations that can be performed to parse a web page into a DOM and cache the corresponding DOM prior to receipt of a request for that page.

Optionally, in some aspects, the described apparatus and methods may further include both the pre-fetching and the pre-derivation operations.

The pre-fetching operation and/or the pre-derivation operation can further increase the speed in rendering an instance of a page, thereby improving a user experience when transitioning from one page to another page.

Thus, the present aspects can efficiently render different instances of a page by reusing a static portion of the DOM, thereby saving processing or communication resources, or both.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, in one aspect, apparatus and methods for rendering a page, such as a web page, include a computer device 10 having a portal component 12 that interacts with a web engine 14 to enable presentation of one or more instances of a page 13, such as a web page, on a display 15. For example, displayed page 13 may be obtained via a communications network 17 from a web server 16 and a data server 18. Web server 16 and data server 18, which may be separate or integrated components, respectively store web resources 20 and 22 and data items 24 and 26 that respectively define a first page instance 28 and a second page instance 30. For example, web resources 20 and 22 may include anything needed to construct a static portion of the page, e.g. an empty page template that can be filled with data, while data items 24 and 26 may include any content used to fill the page, e.g. one or more dynamic portions of the page. As such, all or some portion of web resources 20 and 22 are common to both first page instance 28 and second page instance 30, while all or some portion of data items 24 and 26 are unique to the respective page instance.

More specifically, portal component 12 communicates a received request 32, such as based on a user input or a launching of portal component 12, which identifies a requested instance of a page 34 to web engine 14. For example, the received request 32 may include a first portion that defines a web resource, such as a universal resource locator (URL), and a second portion that defines specific data to fetch, such as a query string. Web engine 14 includes a match determiner 36 that executes to determine if the requested instance of the page 34, as identified by request 32, corresponds to a stored document object model (DOM) 38 for the page. DOM 38 defines a tree or hierarchy of one or more nodes in child-parent relationship, including properties and/or attributes of the respective DOM node and its style attributes, which enables rendering of the page. If the requested instance of the page 34 corresponds to stored DOM 38, then an iterator component 40 identifies one or more static portion(s) 42 of DOM 38 that is/are common to both the requested instance of the page 34 and one or more stored instance(s) of the page 44. Optionally, it should be noted that DOM 38 may further include one or more dynamic portions 46 specific to each of the one or more stored instances of the page 44. For example, stored instance of the page 44 may correspond to first page instance 28, while requested instance of the page 34 may correspond to second page instance 30. Further, based on request 32, iterator component 40 identifies, creates, and stores one or more dynamic portions 48 specific to the requested instance of the page 34. As such, DOM 38 defines a relationship between different instances of a page and one or more respective corresponding dynamic DOM portions that are unique to each page instance, and further corresponding to one or more static DOM portions that are shared by more than one instance of the page. Thus, DOM 38 may be referred to as a shared DOM, as DOM 38 includes a static DOM portion that is the same for both the stored instance of the page 44 and the requested instance of the page 34.

Alternatively, if match determiner 36 determines that requested instance of the page 34 does not match or relate to any stored DOM, then match determiner 36 operates to create and store a new DOM 39 for that page. New DOM 39, which may have a similar structure as shared DOM 38, may then later be referenced by match determiner 36 to determine a match with subsequent requests for instances of pages.

In these aspects, shared DOM 38 may allow for faster rendering of the requested instance of the page 34, as web engine 14 does not need to reconstruct an entire DOM structure for a new instance of a page corresponding to a DOM already stored. Instead, web engine 14 can reuse static DOM portion 42, and only needs to perform the processing related to the one or more dynamic DOM portion(s) 48 corresponding to the requested instance of the page 34.

Additionally, computer device 10 may include a scripting engine 50 operable to perform scripting functionality. For example, web engine 14 interacts with scripting engine 50 to load script corresponding to the page, which scripting engine 50 executes to register the corresponding script functions. In response to an on load event received from web engine 14, scripting engine 50 further runs the page script and generates send calls to initiate the fetching of corresponding dynamic data for the instance of the web page. Further, after receiving the dynamic data, scripting engine 50 is operable to apply the data, for example via a DOM application program interface (API), and write the data to the corresponding DOM. Accordingly, based on the written dynamic data for the respective instance of the page, web engine 14 creates and stores one or more dynamic DOM portions in association with the respective page instance.

Additionally, computer device 10 includes a rendering engine 52 that interacts with web engine 14. For example, in response to a request from web engine 14, rendering engine 52 is operable to paint one or more parts of a respective page that correspond to one or more static DOM portions, and/or that correspond to one or more dynamic DOM portions for the respective instance of the page. Further, rendering engine 52 interacts with display 15 to present the painted portions of the page, thereby presenting a respective instance of the page.

Thus, by providing a DOM having a shared static portion, the described aspects may save communication resources in fetching web resources corresponding to each new instance of a page, or the described aspects may save processing resources in creating portions of the DOM by reusing the static DOM portion, or both.

Figure 2:
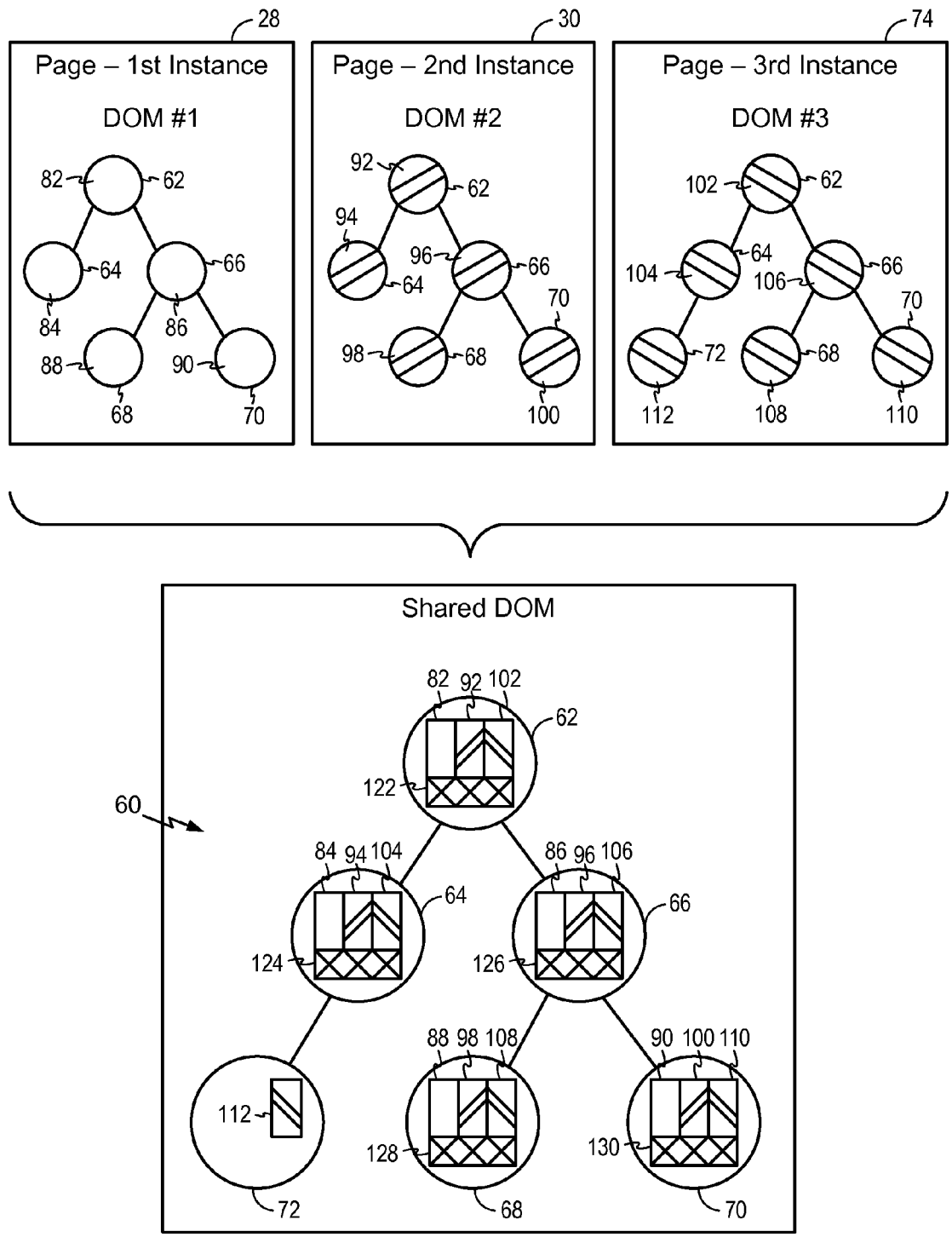
FIG. 2 is a schematic diagram of an aspect of a shared DOM.

Referring to FIG. 2, in one aspect, shared DOM 38 may be further explained as representing a template structure 60 defined by a plurality of nodes, such as nodes 62, 64, 66, 68, 70 and 72, and which further represents different instances of a page, such as first page instance 28, second page instance 30 and third page instance 74. Each page instance, e.g. 28, 30 and 74, share one or more common nodes, such as nodes 62, 64, 66, 68 and 70. The page data respectively associated with each node for each page instance, however, may differ. For example, page data 82, 84, 86, 88 and 90 respectively corresponds to nodes 62, 64, 66, 68 and 70 for first page instance 28, while page data 92, 94, 96, 98 and 100 respectively corresponds to nodes 62, 64, 66, 68 and 70 for second page instance 30, while page data 102, 104, 106, 108 and 110 respectively corresponds to nodes 62, 64, 66, 68 and 70 for third page instance 74. Further, it is noted that some page instances may have more or less nodes than other page instances. For example, in FIG. 2, third page instance 74 includes an additional node 72, having respective page data 112, which is not found in any other page instances.

Shared DOM 38 defines relationships between nodes, page data, and page instances that provide a simple and efficient mechanism to identify and construct the different page instances. For example, shared DOM 38 identifies all of the nodes for the respective page instances 28, 30 and 74, including the shared nodes 62, 64, 66, 68 and 70 and their respective relationship to one another, as well as any nodes unique to any instance, such as node 72. Further, shared DOM 38 includes static DOM portions 122, 124, 126, 128 and 130, e.g. common portions, corresponding to each node as well as dynamic DOM portion or dynamic page data corresponding to each node, such as dynamic data 82, 92 and 102 respectively corresponding to instances 28, 30 and 74 for node 62, dynamic data 84, 94 and 104 respectively corresponding to instances 28, 30 and 74 for node 64, dynamic data 86, 96 and 106 respectively corresponding to instances 28, 30 and 74 for node 66, dynamic data 88, 98 and 108 respectively corresponding to instances 28, 30 and 74 for node 68, and dynamic data 90, 100 and 110 respectively corresponding to instances 28, 30 and 74 for node 70. Additionally, shared DOM 38 includes dynamic DOM portions for unique nodes, such as dynamic data 112 corresponding to third page instance 74 for node 72.

Figure 3:
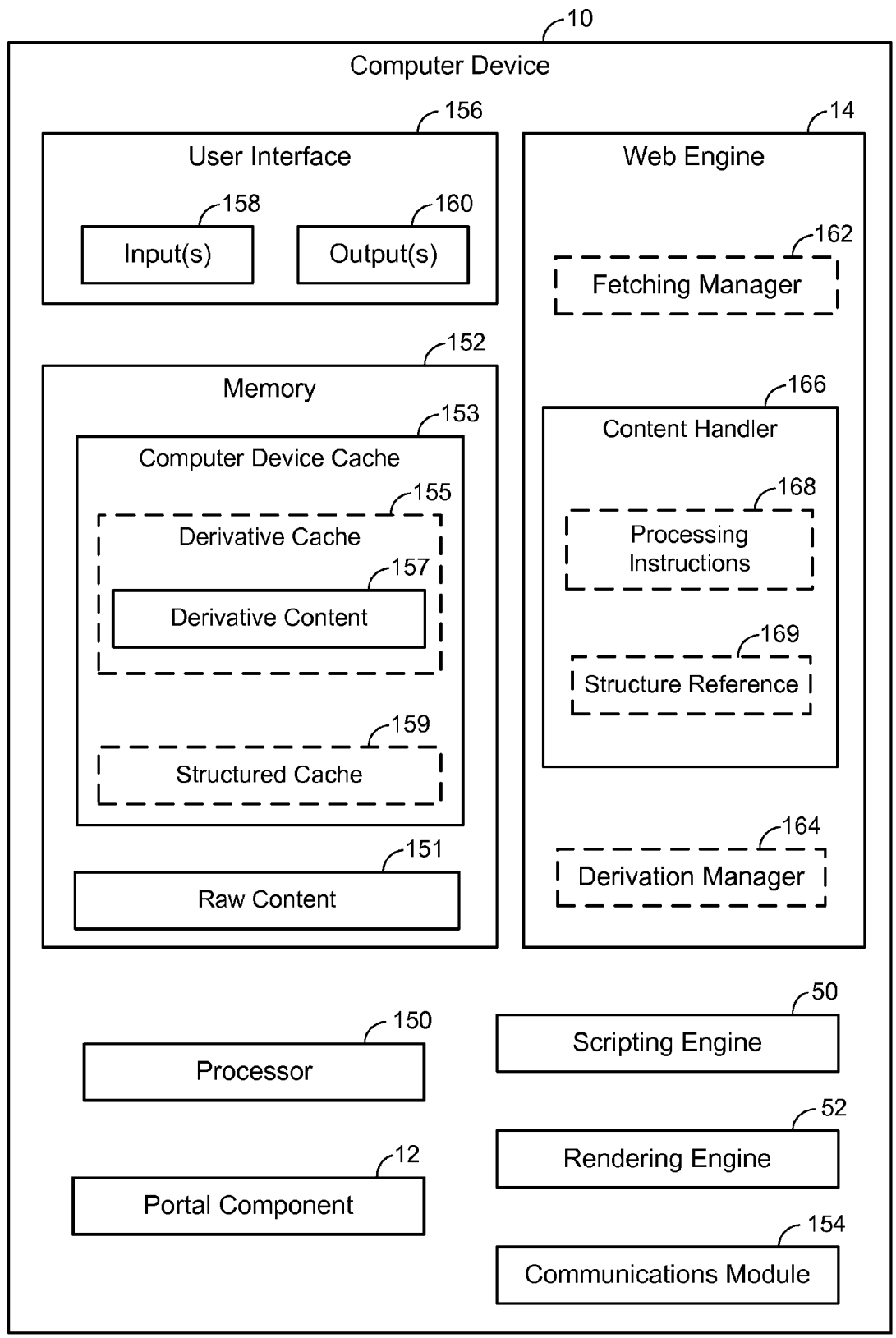
FIG. 3 is a schematic diagram of an aspect of a computer device of FIG. 1.

Referring to FIG. 3, in one aspect, computer device 10, such as a mobile or cellular phone, may include a processor 150 for carrying out processing functions associated with one or more of components and functions described herein. Processor 150 can include a single or multiple set of processors or multi-core processors. Moreover, processor 150 can be implemented as an integrated processing system and/or a distributed processing system.

Computer device 10 may further include a memory 152, such as for storing local versions of applications being executed by processor 150, and/or for long term storage of data, instructions, and/or applications not currently being executed or utilized by processor 150. In one aspect, memory 152 may further comprise derivative cache 155. Upon receipt of content that is intended to be cached, computer device 10 may further process the received content to generate derived content and store the derivative content 157 in the derivative cache 155. In one aspect, this processing may assist to efficiently facilitate subsequent usage of the cached content through pre-preparation of derivative content 157 that is often used. In another aspect, memory 152 may include structured cache 159. Structured cache 159 may allow for storage of content in a manner such that retrieval may be selectively done through choosing select known portions of the content for retrieval. In one aspect, structured cache 159 is organized in such a way as to allow selected known portions of a content item stored in the structured cache 159 to be retrieved without requiring retrieval of the entire content item. Memory 152 can additionally store protocols and/or algorithms associated with estimating and/or utilizing a channel (e.g., performance based, capacity based, etc.). In one aspect, memory 152 may further comprise raw content storage 151. Raw content storage 151 may allow for storage of received raw content.

It will be appreciated that the data store (e.g., memory 152) described herein can be either volatile memory or nonvolatile memory, or can include both volatile and nonvolatile memory. In one aspect, a dual memory model may be used where a first layer is a file system based non-volatile memory and the second layer is a heap structure volatile memory. In such an aspect, raw received content may be stored in the first layer and derivative content may be stored in the second layer. Furthermore, in such an aspect, the second layer may be accessed more quickly than the first layer. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 152 of the subject systems and methods may comprise, without being limited to, these and any other suitable types of memory.

Further, computer device 10 may include a communications component 154 that provides for establishing and maintaining communications with one or more entities utilizing hardware, software, and services as described herein. Communications component 154 may carry communications between components on computer device 10, as well as between computer device 10 and external devices, such as devices located across a communications network and/or devices serially or locally connected to computer device 10. For example, communications component 154 may include one or more buses, and may further include interfaces, one or more transmitters or transmit chain components and one or more receivers or receive chain components operable for interfacing with external devices. For example, such transmitter and receivers may enable wired or wireless communications according to one or more technologies or protocols.

Computer device 10 may additionally include a user interface component 156 operable to receive inputs 158 from a user of computer device 10, and further operable to generate outputs 160 for presentation to the user. User interface component 156 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 156 may include one or more output devices, including but not limited to a display, a speaker, a haptic feedback mechanism, a printer, any other mechanism capable of presenting an output to a user, or any combination thereof.

Additionally, as noted above, computer device 10 may include portal component 12, which may be one or any combination of a web browser, a widget or a mobile widget, or a web application. Portal component 12 is operable to interface with a user of computer device 10, as well as with other components of computer device 10, to enable rendering of a web page.

Web engine 14, as discussed above, manages the determination of matches for DOMs, and the creation and storage of DOMs. Optionally, in some aspects, web engine 14 may include a fetch manager 162 to manage timing and performance of fetch operations. For example, fetch manager 162 may enable pre-fetching of content for the page having a link that was just clicked from a referring page, where the referring page includes the URLs to perform the pre-fetching. In an aspect, for instance, fetch manager 162 may execute a pre-fetch discovery call in the javascript of the referring page. In another aspect, for instance, fetch manager 162 may tag or order URLs to fetch on a page so these tags or URLs can be processed in page rendering prior to receiving a request for the respective page. For example, fetch manager 162 may include algorithms or functions to determine relationships between pages, e.g. adjacent pages in a list, adjacent pages in a hierarchy, etc., in order to determine what to pre-fetch and when to pre-fetch. In other aspects, the described apparatus and methods may include in the HTML head of a current page a manifest of the known URLs, which will be analyzed by fetch manager 162 for pre-fetching. In another aspect, the described apparatus and methods may include in the HTML head of a referring page a structured manifest of the URLs for each reachable page, which will be analyzed by fetch manager 162 to execute pre-fetching for each reachable page. In further derivation of this aspect, the described apparatus and methods may separate out the local 'next page' manifest from the page metadata, inserting this in as a getPageManifest( )call to a GRS. This will allow the server to tune the prefetch order without having to update the page's xhtml page. This is another URL, so expiry and if modified-since can control the caching of this 'caching metadata' resource. In another aspect, the described apparatus and methods may include retrieving this metadata with a broader pre-fetch policy call. Such a policy update may include all the pre-fetch ordering for the whole template set. The pre-fetch ordering may be keyed and fetched initially with the bootstrap manifest.

Optionally, in some aspects, web engine 14 may include a derivation manager 164 to pre-derive a DOM or portions of a DOM prior to request of the respective instance of the page. For example, a big part of the rendering delay has to do with getting the web document parsed into a DOM and ready to render. Derivation manager 164 includes algorithms or functions that provide a layer in managing the derivation of web pages into DOM and caching the DOM prior to when that page is needed. Derivation manager 164 enables such derivation occur in a smart way, likely not when first downloaded via directive from the manifest, but instead the derivation and caching may occur when web engine 14 is relatively unused and the probability of the respective page being needed is high. For example, the algorithms or functions of derivation manager 164 may determine relationships between pages, e.g. adjacent pages in a list, adjacent pages in a hierarchy, etc., in order to determine what to pre-derive and when to pre-derive one or more pages.

It should be noted that fetch manager 162 and derivation manager 164 may be combined in the same computer device 10 to improve the performance for first runs of a page in a session.

Computer device 10 can further comprise content handler 166 to assist in processing of content prior to caching. In one aspect, content handler 166 allows the computer device 102 to determine whether to generate derivative content 157 from the received raw content 151. Further, content handler 166 may receive processing instructions 168 from a communications network. In such an aspect, the communications network may provide processing instructions 168 along with content to be stored at computer device 102. In one aspect, processing instructions 168 may allow some server side control, such as by the communications network, that passes to the computer device 102 in order to perform transformations or the like on the raw content 151 at the computer device 102 in a manner that may be more efficient than without the processing instructions 168. In one aspect, processing instructions 168 may facilitate associating derivative content 157 with received, raw content 151, so as to allow efficient subsequent retrieval. For example, processing instructions 168 may be transmitted with an image and may provide instructions for remapping the image pixels. As such, the size of the content that is transferred with the processing instructions may be small. And once the small-sized raw content and processing instructions are received by the computer device 102, the processing instructions 168 facilitate expanding out the content into a richer image or a more rich set of content. Content handler 166 may further include structure reference 169 to assist in the processing of received content. Structure reference 169 may process received content to facilitate structured storage in structure cache 159.

Scripting engine 50, such as a javascript engine, manages the registering of script functions and the running of script of a given instance of a page. Rendering engine 52 generates or paints all or portions of a given instance of a page, and communicates the results to a component of user interface 156, such as displayed page instance 13 presented on display 15 (FIG. 1).

Figure 4:
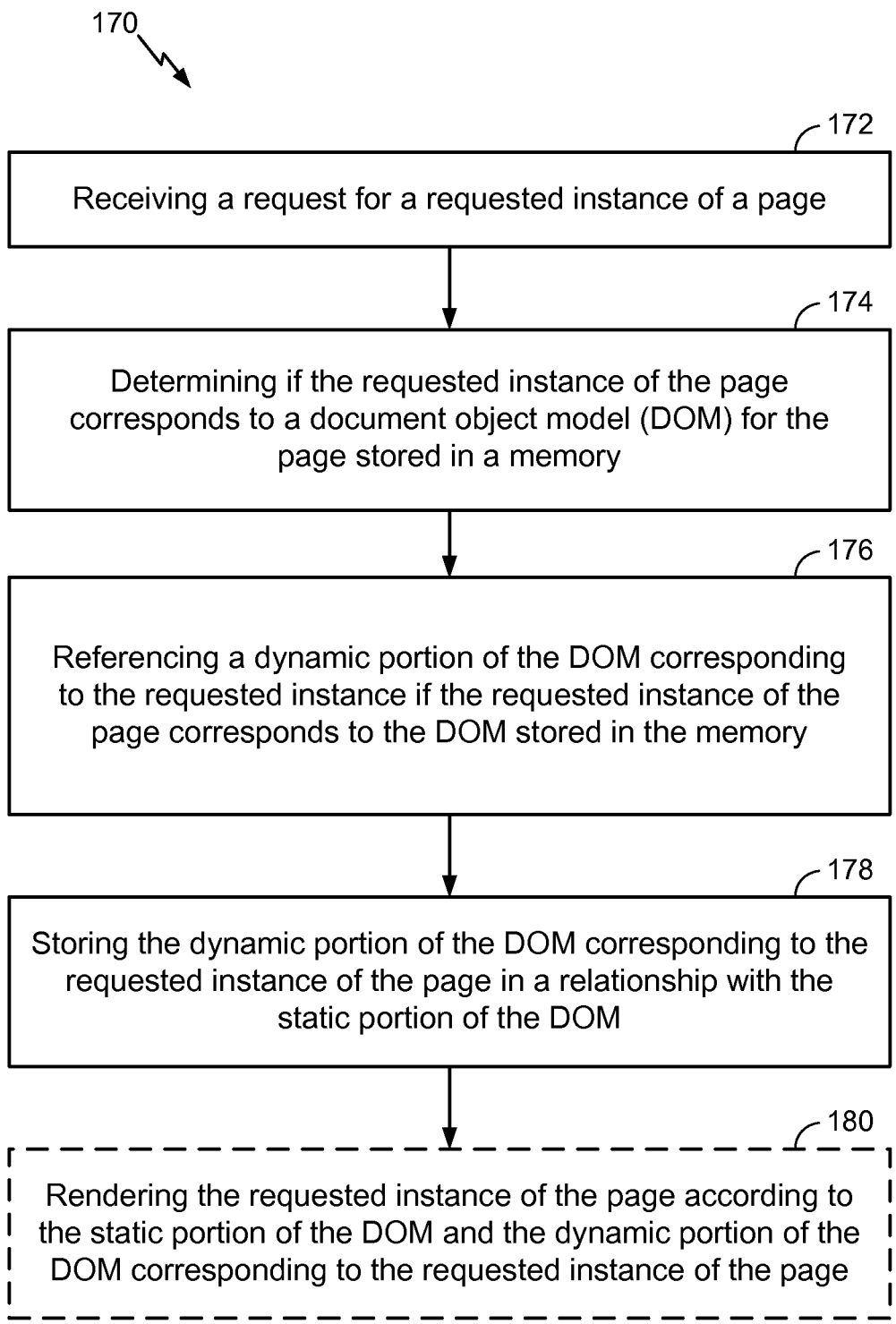
FIG. 4 is a flowchart of an aspect of a method of rendering a page.

Turning now to FIG. 4, in operation, in one aspect, a method 170 of rendering a page includes receiving, at a computer device, a request for a requested instance of a page (Block 172).

The method further includes determining if the requested instance of the page corresponds to a document object model (DOM) for the page stored in a memory. The DOM stored in memory corresponds to a stored instance of the page and comprises a static portion that is the same for both the stored instance and the requested instance of the page (Block 174).

Further, the method includes referencing a dynamic portion of the DOM corresponding to the requested instance if the requested instance of the page corresponds to the DOM stored in the memory. The dynamic portion is unique to the requested instance of the page (Block 176).

The method also includes storing the dynamic portion of the DOM corresponding to the requested instance of the page in a relationship with the static portion of the DOM (Block 178). Optionally, the method further includes rendering the requested instance of the page according to the static portion of the DOM and the dynamic portion of the DOM corresponding to the requested instance of the page (Block 180).

Figure 5:
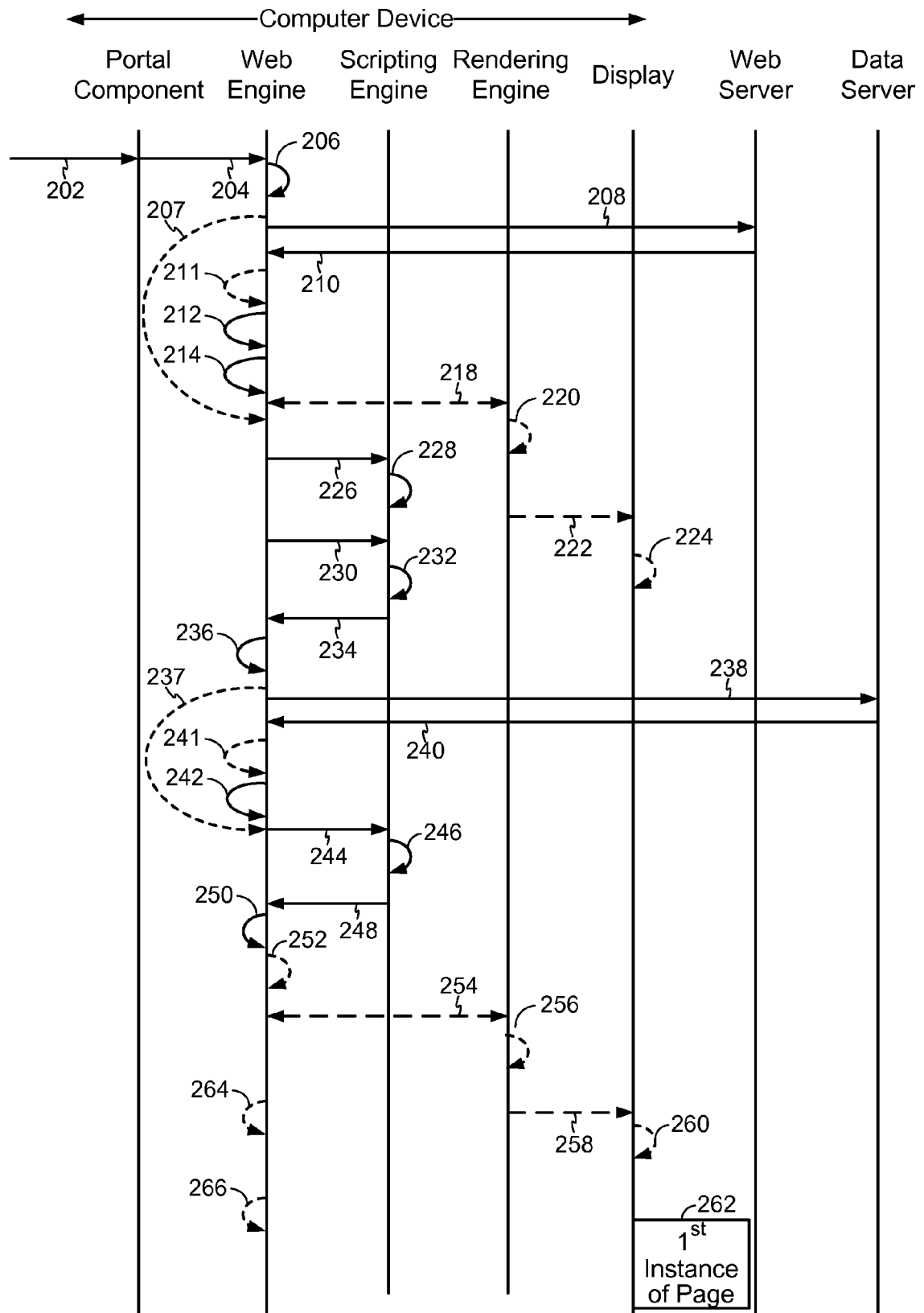
FIG. 5 is a flowchart of an aspect of rendering a first instance of a page.
Figure 6:
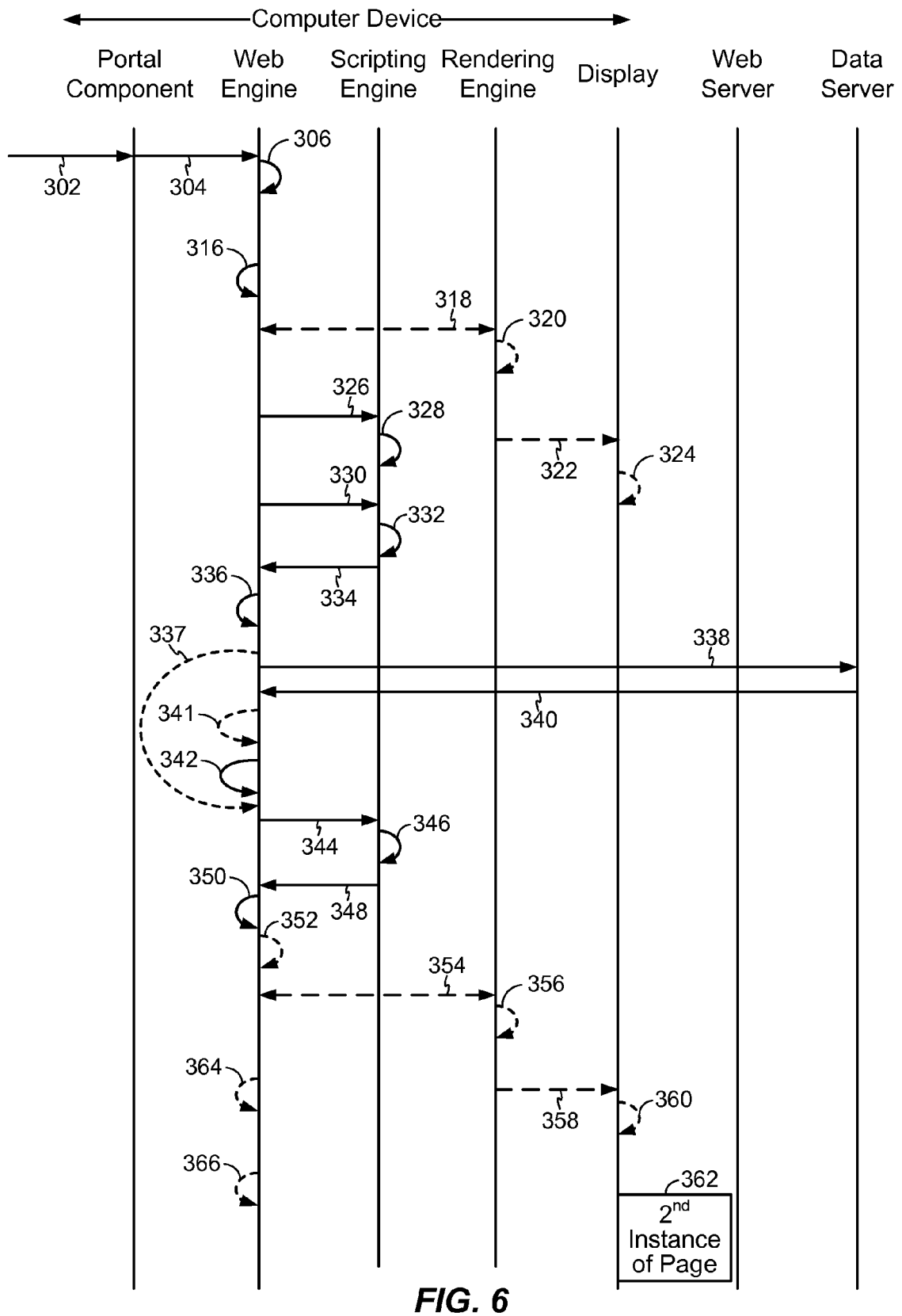
FIG. 6 is a flowchart of an aspect of rendering a second instance of a page.

Referring to FIGS. 5 and 6, in an aspect, a method of rendering a respective first and second instance of a page include requesting a first instance of a page (202, 204, 302, 304), such as based on a user input or launching of a portal application. The method further includes the web engine determining if the instance of the page corresponds to a DOM stored in memory or a cache (206, 306). At 207, if the instance of the page corresponds to a DOM stored in memory or a cache, e.g., a pre-derived DOM, the method continues to the paint process (218). However, if the instance of the page does not correspond to a DOM stored in memory or a cache, a corresponding GET and response is respectively transmitted to and received from a web server (208, 210). The response includes, for example, xhtml, css, and javascript.

Figure 7:
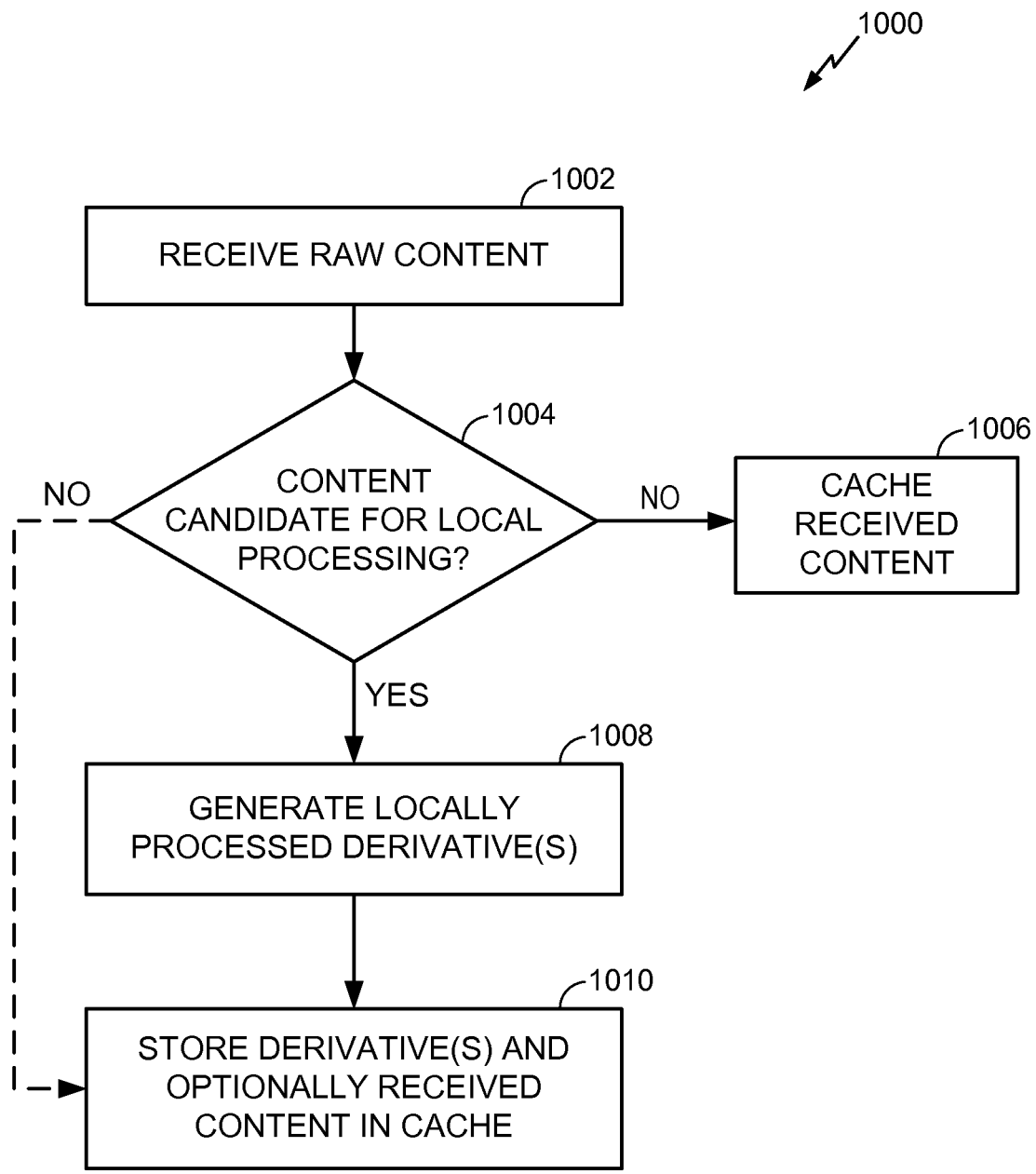
FIG. 7 is an exemplary method for facilitating efficient local caching according to an aspect.
Figure 8:
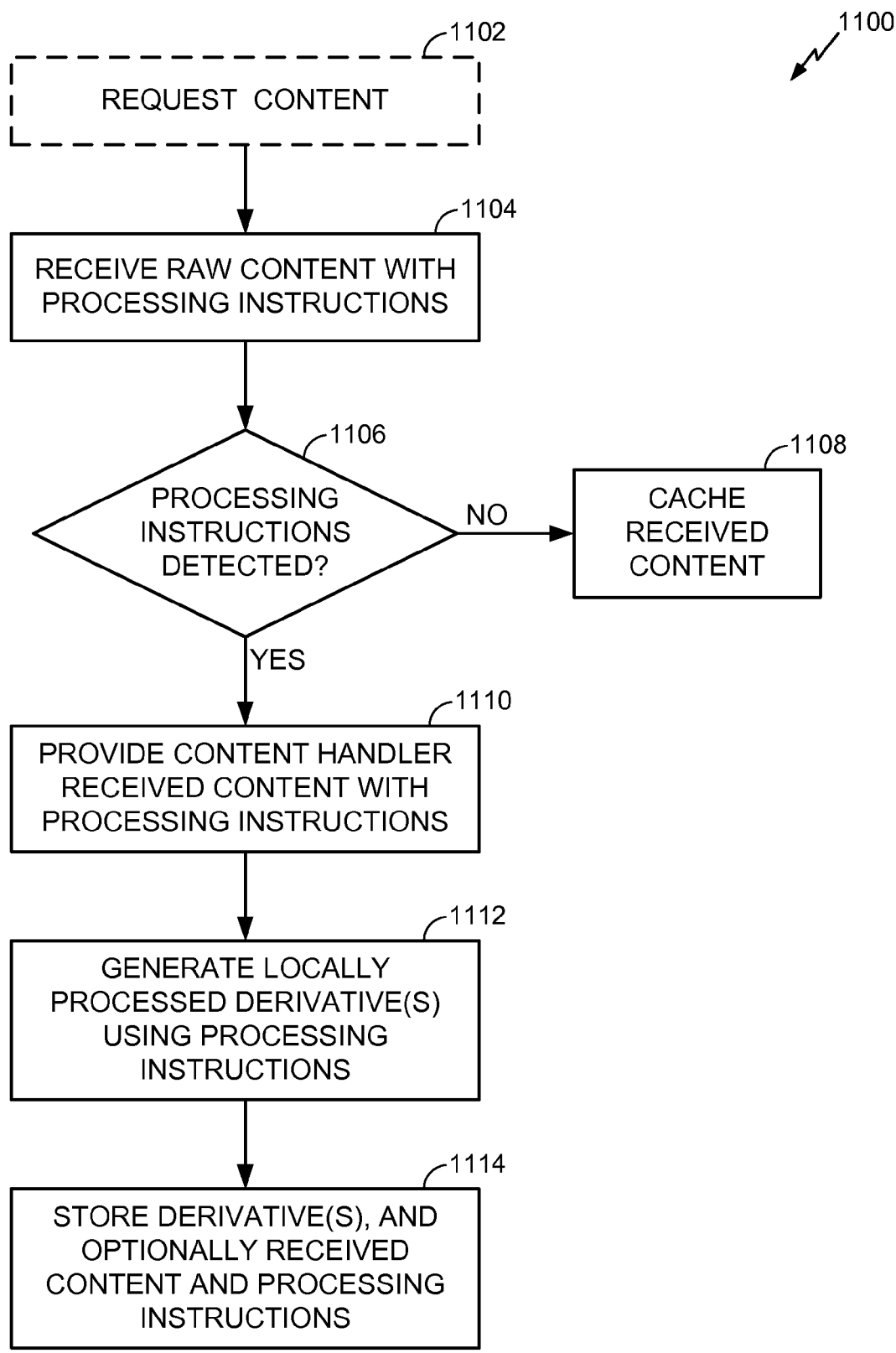
FIG. 8 is an exemplary method for facilitating content modification through processing instructions before storage in cache, according to one aspect.
Figure 9:
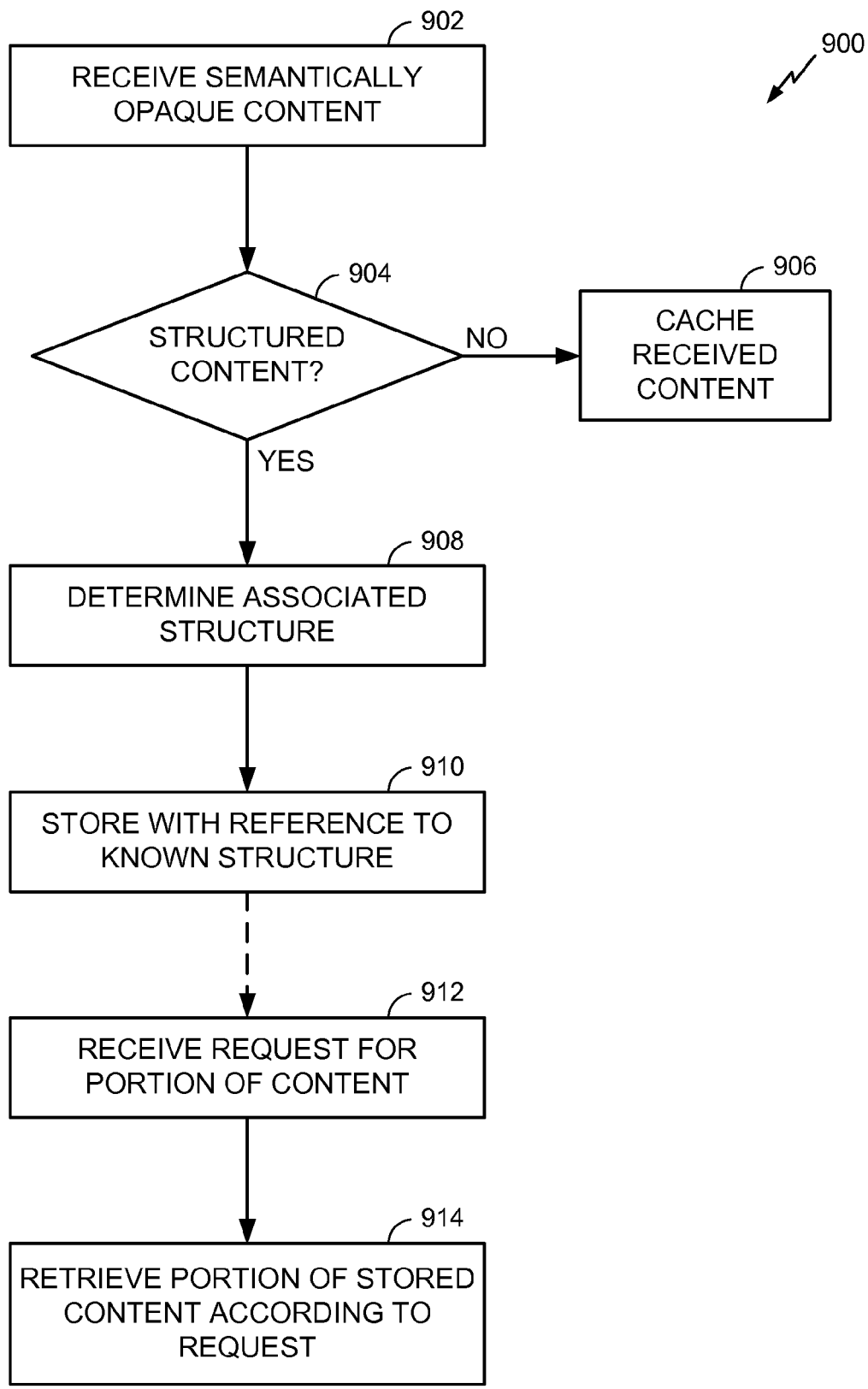
FIG. 9 is an exemplary method for facilitating structured storage in cache, according to one aspect.

In some aspects, at 211, pre-processing of the received content may be performed, e.g., deriving the received content to generate derivative content. In one aspect, raw content obtained from the web server may be accompanied by processing instructions. Upon receipt of the raw content from the web server, a content handler may determine whether additional processing may be performed prior to or contemporaneously with caching the received raw content. In one aspect, the processing instructions assist in at least determining whether to further process the received raw content. In another aspect, the received raw content may be stored in a structured cache as determined by known structure associated with the raw content, such as may be defined by structure reference, server generated entry points, or the like. Once the content handler determines that at least a portion of the received, raw content may be processed, the content handler processes the selected portion of the received, raw content to generate the derivative content. The derivative content may be stored in a derivative cache. In one aspect, the derivative content is further associated with the received raw content and stored accordingly. For example, the derivative content may include compiled javascript and/or compiled css for subsequent use in rendering a respective first and second instance of a page. As discussed below, FIGS. 7-9 illustrate various methodologies for pre-processing the content.

Then, the response data is stored in a cache (212), and a static DOM portion is created and stored (214). Creating and storing the static DOM portion may include deriving the content from the response and transforming the content into a form capable of being processed by the web engine. For example, deriving the content from the response may include parsing the response, e.g., xhtml code, and creating a DOM from the parsed information. Further, rules may be constructed and applied to the DOM for aiding in the creation of the static DOM. The rules may include, for example, CSS Rules, among other types of rules. It should be appreciated that the static DOM may be stored in a memory or a cache for later use. In one aspect, all or a portion of the static DOM is pre-processed (211), and thus the static DOM portion may include derivative content. Alternatively, for the second instance, the static DOM portion is found and used (316). In both cases, a paint process is started to paint and display one or more static DOM portions. More particularly, the web engine starts the paint process (218, 318) and initiates the rendering engine to paint the static portion (220, 320). The rendering engine forwards the painted static portion (222, 322) to the display to display one or more static DOM portions (224, 324). Note that the timing of this painting process may vary. In addition, the derived css content (211) may be used for creating static structures and text during the painting process (220, 320).

Further, after obtaining the response or the stored static DOM portion, a load script operation is initiated (226, 326), where the scripting engine registers script functions (228, 328), receives an onload event (230, 330), and then runs a page script (232, 332). The derived javascript (211) may be used during the scripting functions (228, 232, 328, 332). An XHR send event (234, 334) is then transmitted to the web engine, which checks to see if the data is already stored in a cache (236, 336). If so, at 237 and 337, the stored data can be utilized and passed to the scripting engine (244, 344). If not, then a data fetch and response are respectively transmitted and received from a data server (238 and 240, 338 and 340). This can be an XHR call (238) and XHR results (240). In some aspects, at 241 and 341, pre-processing of the received content may be performed, as discussed above in 211. As discussed below, FIGS. 7-9 illustrate various methodologies for pre-processing the content.

The response data is stored in a cache (242, 342), and the results are passed to the scripting engine (244, 344), which applies the data via a DOM API and writes the data to the cache in the web engine (246 and 248, 346 and 348). The web engine then creates and stores a dynamic DOM portion for the given instance for one or more dynamic portions of the data (250, 350). The web engine may buffer this DOM portion (252, 352), as painting operations can be resource expensive. Then, the web engine initiates a paint operation, similar to the above operation for the static portion, which results in the given instance of the page being created. The web engine starts the paint process (254, 354) and initiates the rendering engine to paint the static portion (256, 356). The rendering engine forwards the painted static portion (258, 358) to the display for displaying one or more static DOM portions (260, 360) resulting in the given instance of the page being created (262, 362). Additionally, it is noted that the derived css content (241, 341) may be used for creating static structures and text during the painting process (256, 356).

Optionally, in some aspects, the methods of FIGS. 5 and 6 may include one or more pre-fetching operations (264, 364) as described above with reference to fetching manager 162 (FIG. 3). It should be noted that the timing in the sequence of operations of FIGS. 5 and 6 of the pre-fetching operation may be changed relative to the illustrated action, based on the determinations of when such pre-fetching is desired. Further, it should be noted that the pre-fetching operation may further include additional GETs and responses, and/or XHR calls and results, and corresponding prior and subsequent processing, as described above.

Optionally, in some aspect, the methods of FIGS. 5 and 6 may include one or more pre-derivation operations (266, 366) as described above with reference to derivation manager 164 (FIG. 3). It should be noted that the timing in the sequence of operations of FIGS. 5 and 6 of the pre-derivation operations may be changed relative to the illustrated action, based on the determinations of when such pre-derivation is desired. Further, it should be noted that the pre-derivation operations may further include additional GETs and responses, and/or additional XHR calls and results, and corresponding prior and subsequent processing, as described above.

Turning now to FIG. 7, exemplary method 1000 for facilitating efficient local caching is illustrated. At reference numeral 1002, raw data is received. In one aspect, the data may be accompanying by processing instructions. The data may be received by a computer device or the like and the data may originate from a server, communications network etc. For example, in an aspect, the raw data may include css and javascript.

At reference numeral 1004, the method includes determining whether the received data is a candidate for local processing. For example, the received data may include processing instructions prompting further processing. In another aspect, the received data may be of a known data type prompting further processing, such as css or javascript. If it is determined that no further processing is required, then at reference numeral 1006, the received data may be cached. Additionally or optionally, in one aspect, received data may be cached irrespective of whether the data is a candidate for further processing. By contrast, if at reference numeral 1004 it is determined that further processing is prompted, then, at reference numeral 1008, locally derived content is generated from the received content. In one aspect, processing instructions may guide the content handler in generating the derivative content. For example, a received image may be processed to generate one or more sizes commonly used on a computing device. In another example, a received program file may be processed to generate a compiled program for subsequent use by a computing device. In still another example, a received font type may be processed to generate various commonly used color and/or size variations for subsequent use by a computing device. At reference numeral 1010 at least the derivative content is stored in the cache. In another aspect, the derivative content and the received content are stored and associated to aid in subsequent retrieval. In one aspect, caching of raw data and one or more derived content items may improve perceived application performance by eliminating processing requirements after retrieval for derivative content items. In still another aspect, the processing instructions are stored with the derivative content and the received content and used to associate the derived and received content.

Turning now to FIG. 8, exemplary method 1100 for facilitating content modification through processing instructions before storage in cache is illustrated, according to one aspect.

In one aspect, at reference numeral 1102, a computing device may request, fetch or the like content to be stored in cache. In such an aspect, the request may be accompanied with negotiation instructions. For example, the request may be for an image, with accompanying instructions providing a possible pixel range of a preferable image. Generally, at reference numeral 1104, raw data is received. Such data may be accompanying by processing instructions. In one aspect, these processing instructions are generated at least in part in response to the request negotiation instructions. The data may be received by a computer device or the like and the data may originate from a server, communications network, etc.

Next to be described, at reference numeral 1106, it is determined whether the received data is a candidate for local processing by analyzing the accompanying processing instructions. If the processing instructions do not prompt further processing, then at reference numeral 1108, the received data may be cached. By contrast, if at reference numeral 1106 processing instructions prompt additional processing, then, at reference numeral 1112, a content handler may be provided with the processing instructions and the received content. At reference numeral 1112, locally derived content, e.g. derivative content, is generated from the raw content using processing instructions as a guide. As such, a server or the like may facilitate processing of raw content after transmission. For example, a received image may be processed to generate to an image with less granularity by the processing instructions prompting the content handler to smooth gradations of the received image.

At reference numeral 1114, at least the derivative content is stored in the cache. In another aspect the derived and received content are stored and associated to aid in subsequent retrieval. In still another aspect, the processing instructions are stored with the derived and received content and used to associate the derived and received content.

Turning now to FIG. 9, exemplary method 900 for facilitating structured storage in cache is illustrated. Generally, at reference numeral 902, semantically opaque data is received. In one aspect, the data may be accompanying by server generated entry points to allow structured retrieval of selected portions. In another aspect, the data may be of a known structure. The data may be received by a computer device or the like and the data may originate from a server, content provider, etc.

Next to be described, at reference numeral 904, it is determined whether the received data may be associated with a known structure. For example, the received data may include server generated entry points or may be of a known structure. If it is determined that the data is not structured in a manner allowing further processing, then at reference numeral 906, the received data may be cached. By contrast, if at reference numeral 904 it is determined that further processing is prompted, then, at reference numeral 908, the data structure may be determined. For example, certain media types may be defined with known structures that allow for processing to facilitate selective subsequent retrieval. At reference numeral 910, the received structured content is stored with reference to its known content.

In one aspect, at reference numeral 912, a request for a portion of structured content may be received. In such an aspect, at reference numeral 914 the requested portion of the structured content may be retrieved. For example, information associated with the manufacturer, or the title, or the like may be selectively retrieved from the structured content in the cache without removal of the entire content item.

Figure 10:
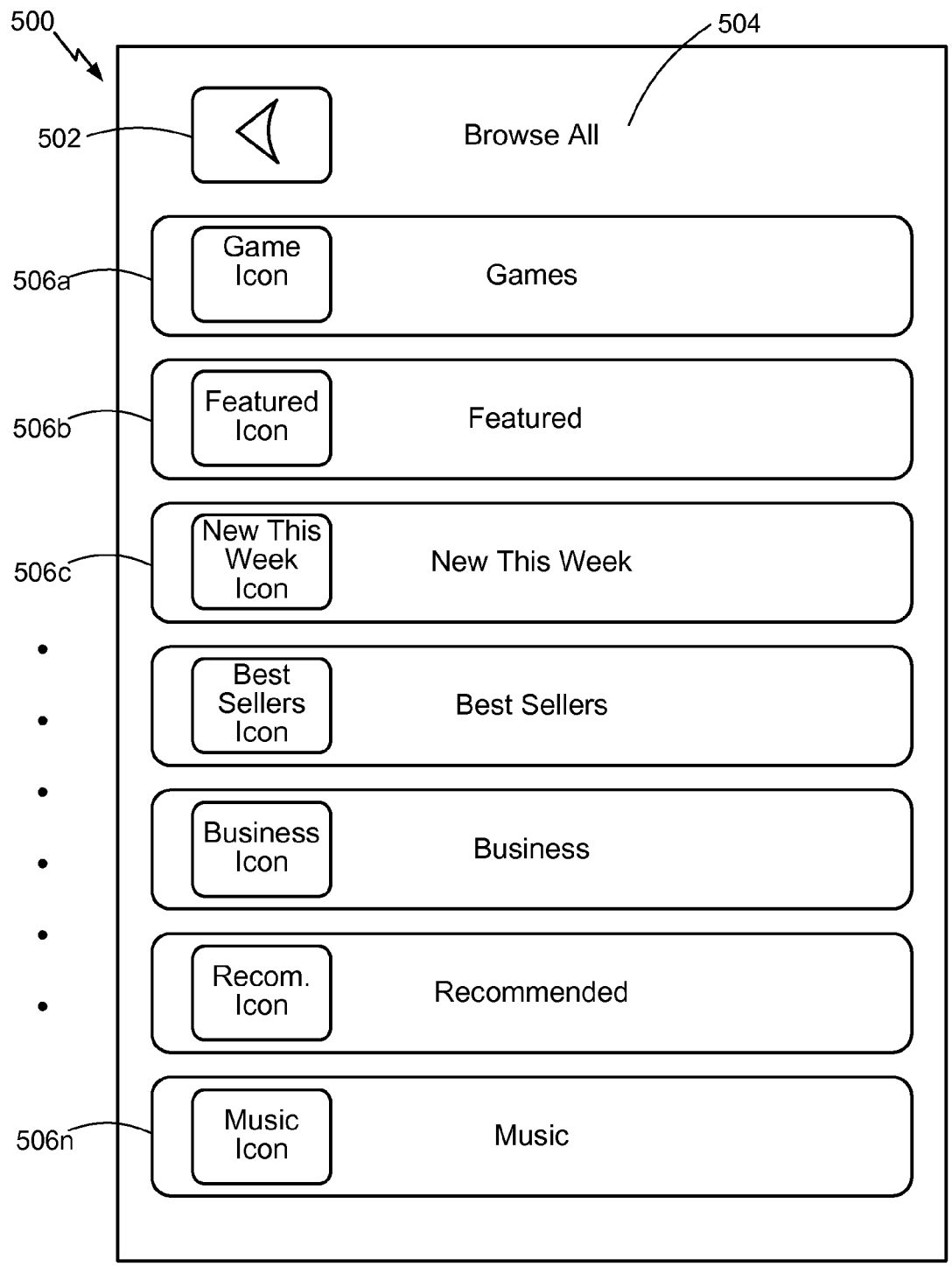
FIG. 10 is a schematic diagram of an example main page in accordance with an aspect.
Figure 11:
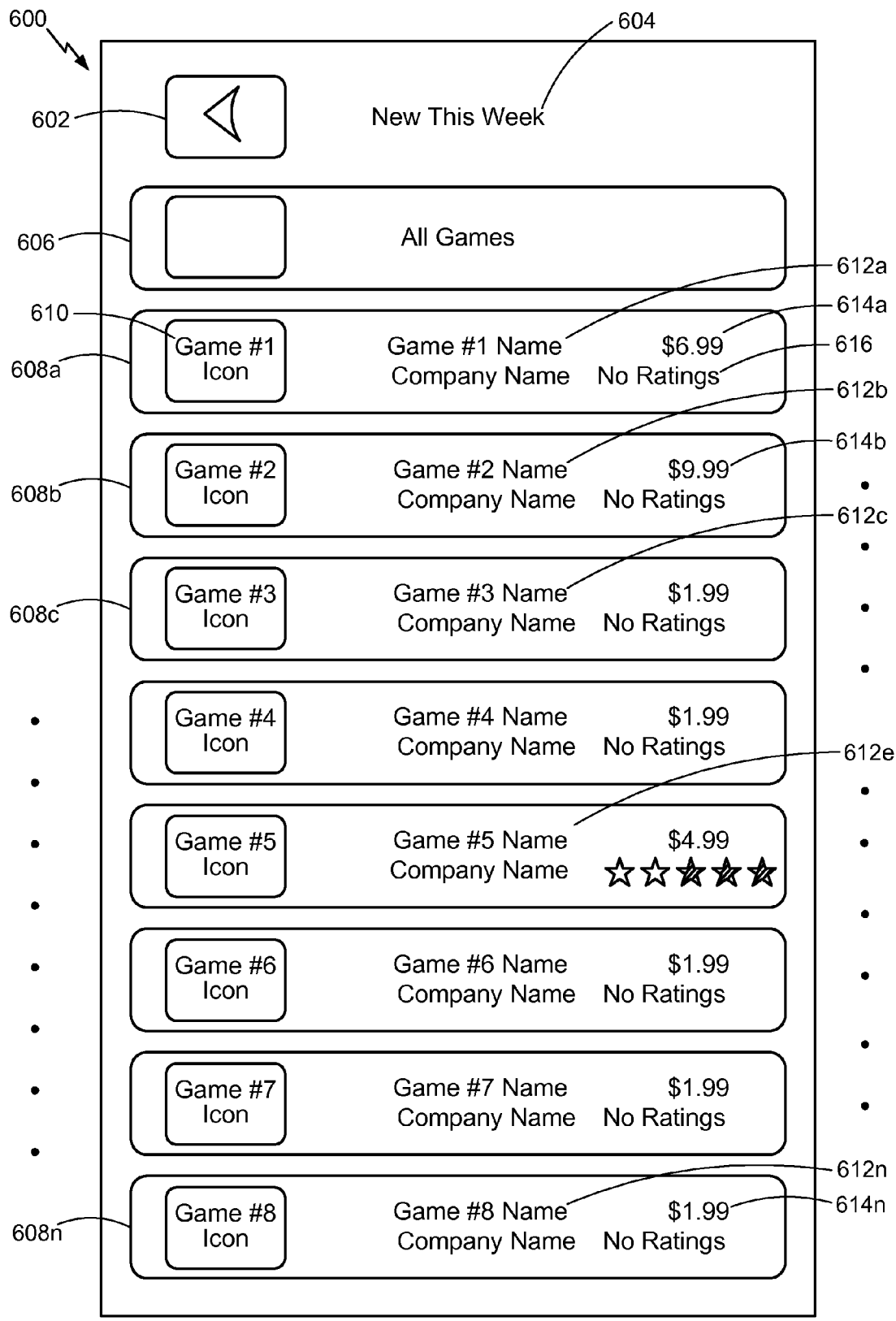
FIG. 11 is a schematic diagram of an example catalog page in accordance with an aspect.

One illustrative example of a mobile shopping application executed by a mobile phone in accordance with an aspect is illustrated in FIGS. 10-13. Turning now to FIG. 10, in an aspect, a main page 500, e.g., a first instance of a page, may be requested by a user and displayed on the mobile device as discussed above in relation to FIGS. 1-7 above. Main page 500 may include a catalog listing 504 with information relating to the various items in the catalog. Catalog listing 504 may include, among other information, a listing of categories of data in the catalog, e.g., 506a-506n, promotional information for items in the catalog, previews and/or descriptions of items in the catalog, or items to purchase from the catalog. If a user wants to view a different catalog listing, a user may move to a different catalog listing in the shopping application by selecting button 502, for example. Alternatively, or in addition, a user may select, for example, one of the categories of data in the catalog, e.g., "New This Week" 506c, and move to a catalog page for the selected category. An example of a catalog page, e.g., a second instance of a page, is illustrated in FIG. 11.

Referring now to FIG. 11, in an aspect, catalog page 600 may be requested by a user and displayed on the mobile device, e.g., the user selects catalog page 600 from the main page 500 (FIG. 10). When catalog page 600 is requested, the mobile device may determine whether catalog page 600 has similar structures corresponding to main page 500 and/or other pages in the shopping application. Upon determining that the catalog page 600 has similar structures as main page 500, the mobile device may retrieve and reuse the similar structures of catalog page 600 from the DOM of main page 500. In addition, the mobile device may determine that catalog page 600 has structures that are different from main page 500 and may create a DOM for the items unique to catalog page 600.

Catalog page 600 may include a title 604, e.g., "New This Week," describing the listing of items to purchase 608a-608n and/or categories of items 606. Categories may include, for example, games, music, videos, best sellers, featured items, and/or recommended items, among other categories. It should be appreciated that title 604 may correspond to the selection the user choose on the main page 500 (FIG. 10). In addition, the items to purchase 608a-608n may include: a name 612a-612n describing the item for purchase; a price 614a-614n for the item; an icon 610a-610n illustrating and/or describing the item for purchase; displayed ratings 616a-610n for the item (e.g., stars or text summarizing data relating to the quality and/or performance of the item for purchase); and the supplier for the item, among other information relating to the items for purchase. It should be appreciated that the items for purchase may include, for example, games, music, videos or books, among other items.

For example, the mobile device may determine that the title 604, the listing of items to purchase 608a-608n and/or categories of items 606 have similar structure as features in main page 500 (e.g., title 504, button 502 and listings 506a-506n) and may retrieve and reuse the similar structures from main page 500 DOM. In addition, the mobile device may determine that the name of the title 604, e.g., "New This Week", names for the games 612a-612n, icons for the games 608a-608n, prices for the games 614a-614n, and/or the ratings for the games 616a-616n are unique to catalog page 600, and thus, may create a dynamic DOM for the features that are unique to catalog page 600.

Therefore, the mobile device is creating a dynamic DOM for the portions of catalog page 600 that are unique to catalog page 600 and reusing similar structure and/or instances from the static DOM of main page 500. Thus, allowing for faster rendering of catalog page 600 since the mobile device does not need to reconstruct an entire DOM structure for catalog page 600.

If a user wants to view a different catalog page or return to the main page 500, the user may move to different catalogs page in the shopping application by selecting button 602, for example. Alternatively, or in addition, a user may select, for example, one of the categories and/or items listed on the catalog page 600, e.g., the game "Game #5 Name" 612e, and move to an item page, e.g., another second instance of a page. Examples of an item page, e.g., a second instance of a page, are illustrated in FIGS. 12 and 13.

Figure 12:
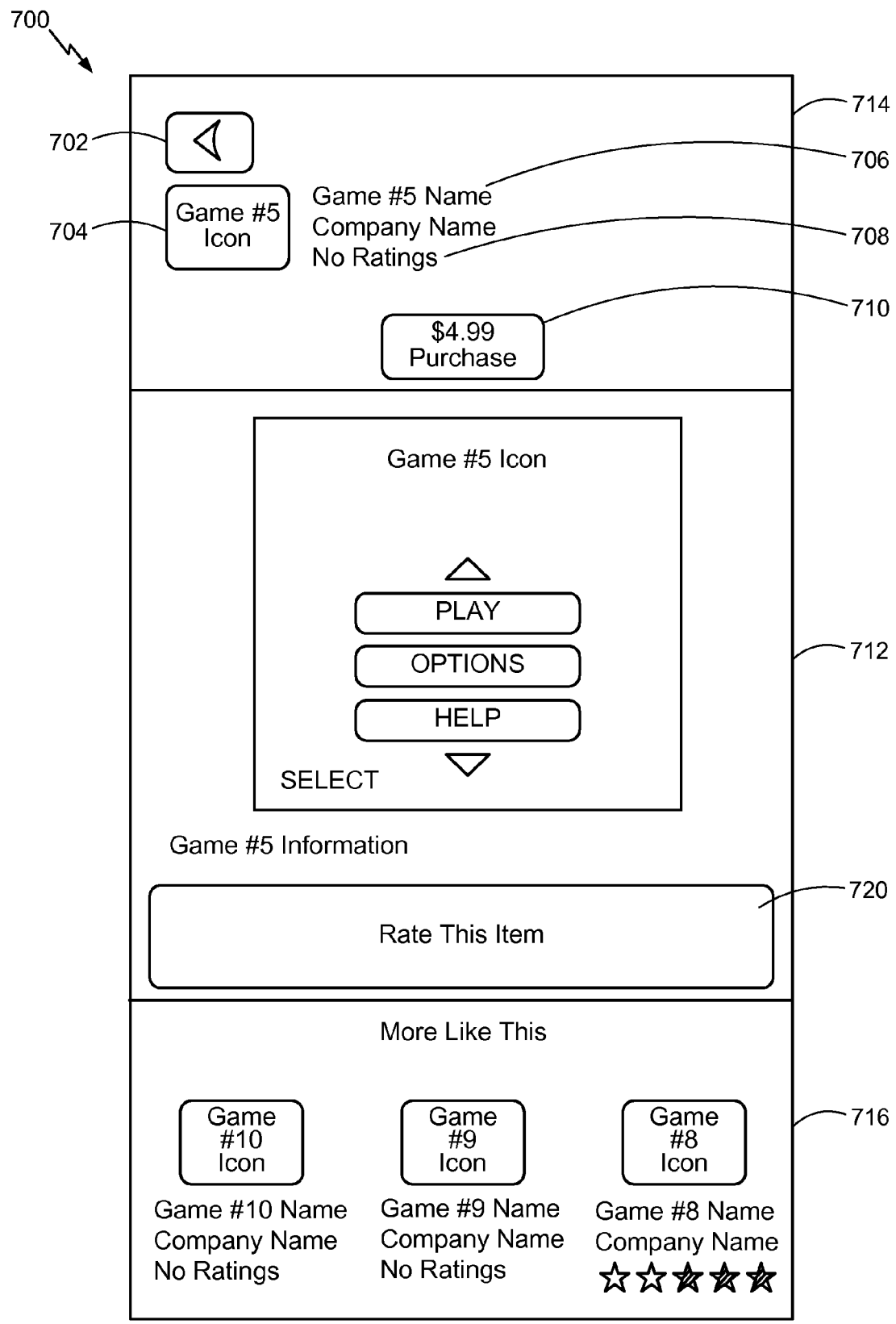
FIG. 12 is a schematic diagram of an example of an item detail page in accordance with an aspect.
Figure 13:
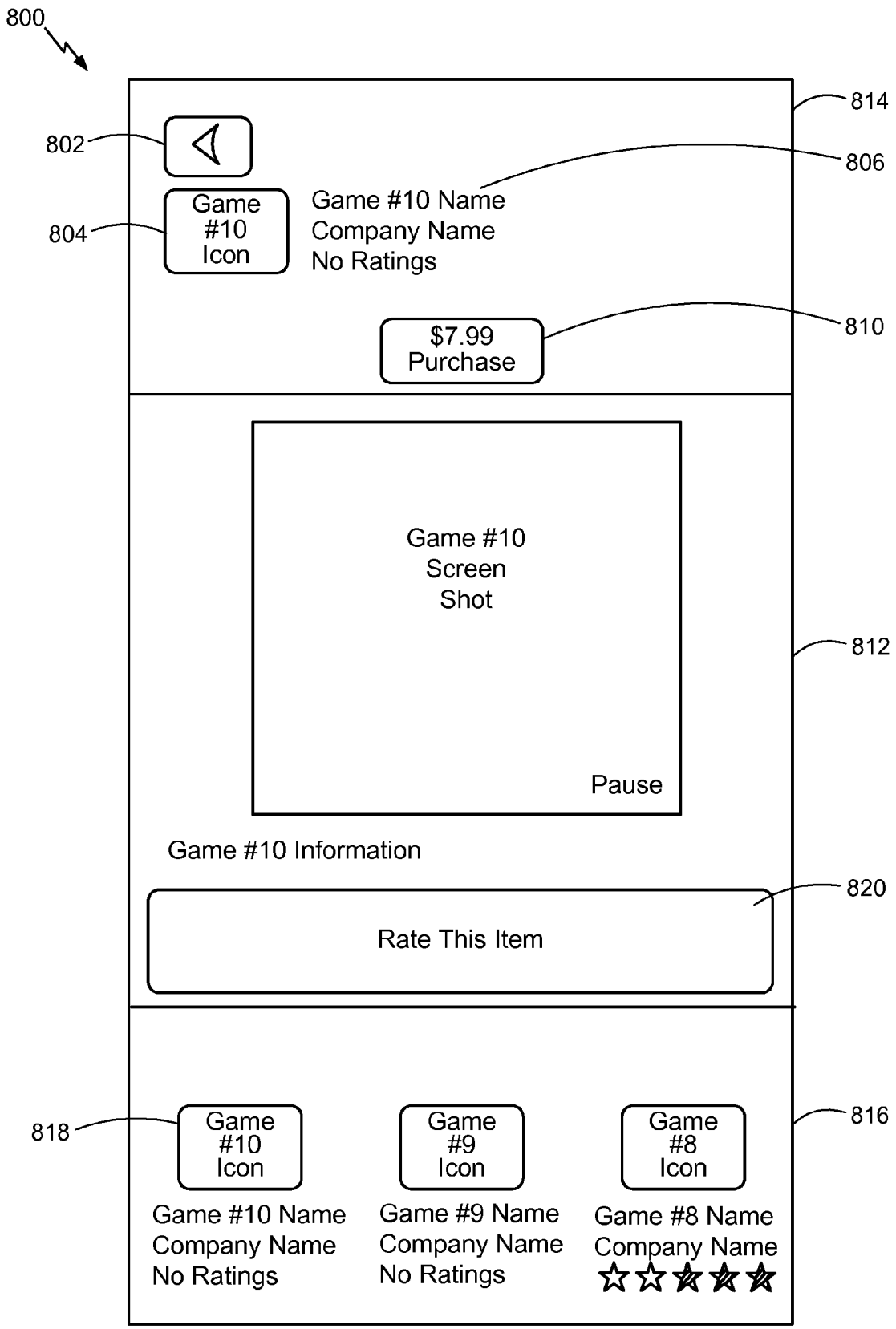
FIG. 13 is a schematic diagram of another example of an item detail page in accordance with an aspect.

Referring now to FIG. 12, in an aspect, item detail page 700 may be requested by a user and displayed on the mobile device, e.g., the user selects item detail page 700 from catalog page 600 (FIG. 11). When item detail page 700 is requested, the mobile device may determine whether item detail page 700 has similar structures and/or instances corresponding to catalog page 600, main page 500 and/or other pages in the shopping application. As discussed above in relation to FIG. 11, the mobile device may retrieve and reuse the similar structures of catalog page 600 and/or main page 500 from the DOMs of main page 500 and/or catalog page 600. In addition, the mobile device may create a DOM for the portions of item detail page 700 that do not match the structure or items in catalog page 600 and/or main page 500.

For example, the mobile device may determine that button 702, game name 706, icon 704, price 710 and ratings for the game 708 on the item detail page 700 may have similar structure as features as catalog page 600 and may retrieve and reuse the similar structures from catalog page 600 DOM. In addition, the mobile device may create a DOM for the portions of item detail page 700 that do not match the structure or items in catalog page 600 and/or main page 500, e.g., rate this item option 720, more like these recommendations 716. Therefore, the mobile device is creating a dynamic DOM for the portions of item detail page 700 that are unique to item detail page 700 and reusing similar structure and/or instances from catalog page 600 and/or main page 500. Thus, allowing for faster rendering of item detail page 700 since the mobile device does not need to reconstruct an entire DOM structure for item detail page 700.

If a user wants to view the previous page, the user may select button 702 to return to the previous page in the shopping application. Alternatively, or in addition, a user may select, for example, another item on the item detail page 700, e.g., the game "Guitar Hero III" 718, and move to another item detail page, e.g., item detail page 800 illustrated in FIG. 13.

Turning now to FIG. 13, illustrated is another example of an item detail page 800 in accordance with an aspect. As discussed above in relation to FIG. 12, the mobile device may determine whether item detail page 800 has similar structures and/or instances corresponding to item detail page 700, catalog page 600, main page 500 and/or other pages in the shopping application. The mobile device may retrieve and reuse the similar structures of item detail page 700, catalog page 600 and/or main page 500 from the DOMs of item detail page 700, main page 500 and/or catalog page 600. In addition, the mobile device may create a dynamic DOM for the portions of item detail page 800 that do not match the structure or items in item detail page 700, catalog page 600 and/or main page 500. For example, in this case, the static DOM portion may comprise a same layout of item detail page 700, while the dynamic data items, such as the game name 806, the game rating 808 and the price for the game 810, are represented by a dynamic DOM portion.

Figure 14:
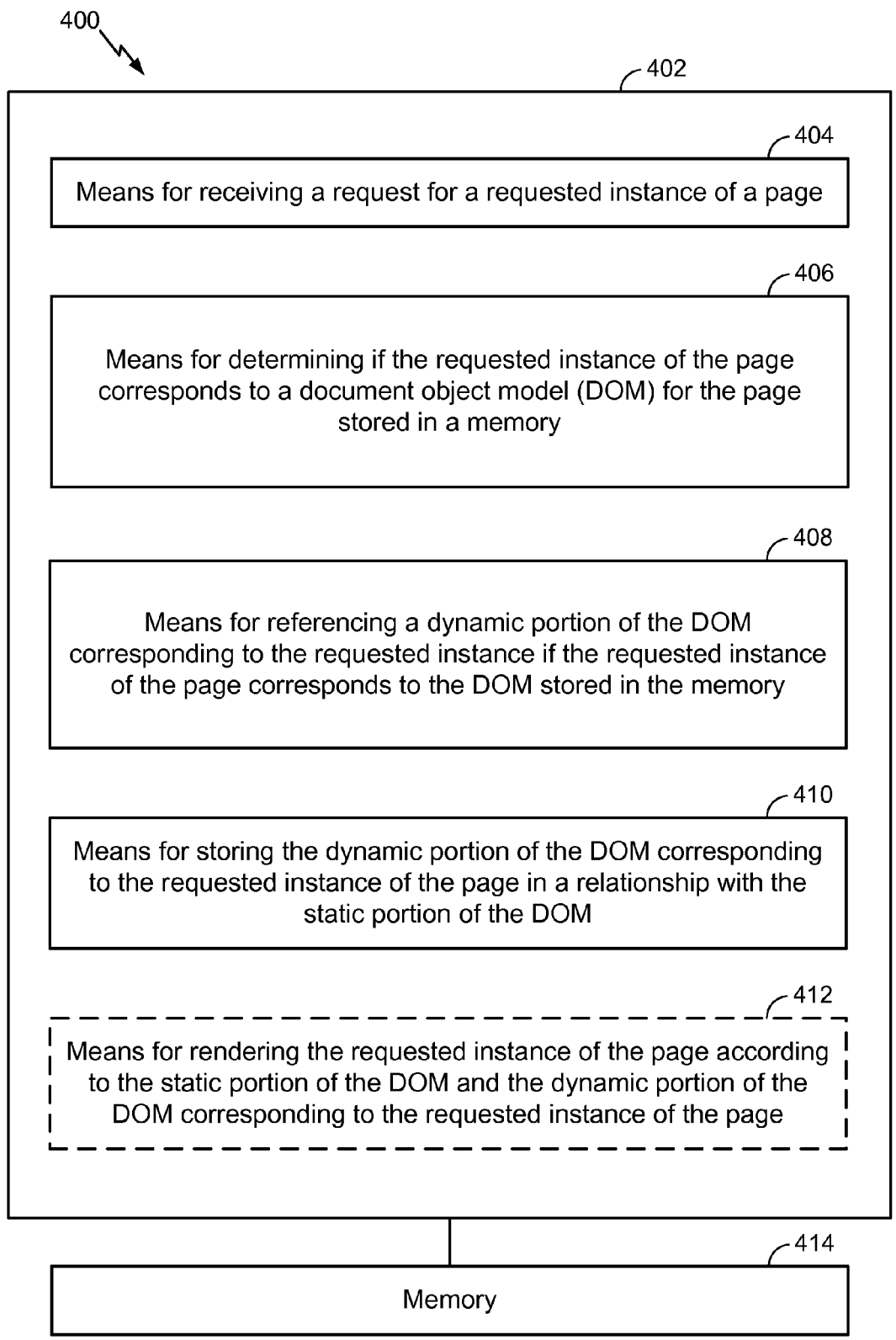
FIG. 14 is a schematic diagram of an aspect of an apparatus for rendering a page.

Referring to FIG. 14, illustrated is an apparatus 400 that renders pages, such as web pages, received from a web server and data server via a content provider. In some aspects, for example, apparatus 400 can reside within a mobile device. As depicted, apparatus 400 includes functional blocks that can represent functions implemented by a processor, or software, or combination thereof (e.g., firmware). Apparatus 400 includes a logical grouping 402 of electrical components that facilitate receiving web resources and data corresponding to a page, and rendering an instance of the page. Logical grouping 402 can include a means for receiving, such as at a computer device, a request for a requested instance of a page 404. Further, logical grouping 402 can include a means for determining if the requested instance of the page corresponds to a document object model (DOM) for the page stored in a memory 406, wherein the DOM stored in memory corresponds to a stored instance of the page and comprises a static portion that is the same for both the stored instance and the requested instance of the page. Also, logical grouping 402 can include a means for retrieving a dynamic portion of the DOM corresponding to the requested instance if the requested instance of the page corresponds to the DOM stored in the memory 408, wherein the dynamic portion is unique to the requested instance of the page. Additionally, logical grouping 402 can include a means for storing the dynamic portion of the DOM corresponding to the requested instance of the page in a relationship with the static portion of the DOM 410. Optionally, logical grouping 402 can include a means for rendering the requested instance of the page according to the static portion of the DOM and the dynamic portion of the DOM corresponding to the requested instance of the page 412. Thus, apparatus 400 can efficiently reuse static DOM portions in rendering a page, and create and store a shared DOM having relationships defining one or more dynamic DOM portions corresponding to a respective one or more instances of a page.

Additionally, apparatus 400 can include a memory 414 that retains instructions for executing functions associated with electrical components 404, 406, 408, 410 and optionally 412. While shown as being external to memory 414, it is to be understood that electrical components 404, 406, 408, 410 and optionally 412 can exist within memory 414.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for efficient page rendering on a computer device, comprising:
fetching, at the computer device, a first page;
storing a document object model (DOM) shared among different pages in a memory at the computer device, wherein the DOM stored in the memory defines a relative structure associated with the first page, and wherein the DOM comprises a static portion corresponding to one or more common elements shared among the different pages and a first dynamic portion unique to the first page;
transitioning, at the computer device, to a second page;
retrieving, at the computer device, only dynamic data corresponding to a second dynamic portion unique to the second page from a server in response to the second page having a structure similar to the relative structure associated with the first page as defined in the DOM shared among the different pages;
creating, at the computer device, the second dynamic portion unique to the second page based on the dynamic data retrieved from the server;
updating the DOM stored in the memory to include the second dynamic portion unique to the second page such that the static portion in the updated DOM is shared among the first page and the second page and defines a relationship between the static portion corresponding to the one or more common elements shared among the different pages, the first dynamic portion unique to the first page, and the second dynamic portion unique to the second page; and
rendering, at the computer device, the second page according to at least the relationship defined in the DOM between the static portion corresponding to the one or more common elements shared among the different pages and the second dynamic portion unique to the second page.

2. The method of claim 1, further comprising rendering, at the computer device, the second page according to the relative structure associated with the first page as defined in the DOM.

3. The method of claim 2, wherein the rendering further comprises reusing the static portion corresponding to the one or more common elements shared among the different pages and processing the second dynamic portion unique to the second page.

4. The method of claim 1, further comprising:
receiving, to a local cache, raw content;
generating derivative content from at least a portion of the received raw content in response to determining that at least the portion of the received raw content triggers derivative processing;
associating the derivative content with at least the portion of the received raw content used to generate the derivative content; and
storing the derivative content in the local cache.

5. The method of claim 4, further comprising:
receiving processing instructions with the raw content; and
applying the processing instructions to determine whether at least the portion of the received raw content triggers the derivative processing,
wherein generating the derivative content further comprises using the processing instructions to process at least the portion of the received raw content.

6. The method of claim 1, further comprising:
receiving, to a local cache, semantically opaque content; and
storing at least a portion of the received semantically opaque content in a structured cache according to a known structure that allows for portions of the stored semantically opaque content to be selectively retrieved through a defined formulation.

7. The method of claim 1, further comprising receiving a first request for the first page and a second request for the second page, wherein the first request and the second request each comprise a first portion for defining a location for the respective page and a second portion for defining the dynamic data to retrieve for the respective page.

8. The method of claim 1, wherein the DOM represents the relative structure associated with the first page and the second page and the relationship between the static portion corresponding to the one or more common elements shared among the different pages, the first dynamic portion unique to the first page, and the second dynamic portion unique to the second page according to a hierarchy.

9. The method of claim 8, further comprising pre-deriving and storing the static portion corresponding to the one or more common elements shared among the different pages in the DOM prior to receiving a request for the first page.

10. The method of claim 9, wherein the pre-deriving further comprises:
parsing content from the first page for creating the DOM; and
applying one or more rules to the DOM for creating the static portion corresponding to the one or more common elements shared among the different pages.

11. The method of claim 1, further comprising pre-fetching content from the second page prior to the computer device transitioning to the second page.

12. The method of claim 11, wherein the pre-fetching includes using one or more algorithms to determine relationships between the first page and one or more adjacent pages and to determine the content to pre-fetch from the second page based on the one or more adjacent pages including the second page.

13. The method of claim 9, further comprising:
determining that the hierarchy represents a relationship between the first page and one or more adjacent pages; and
determining a probability that the first page will be requested based on the relationship between the first page and the one or more adjacent pages, wherein the static portion corresponding to the one or more common elements shared among to the different pages is pre-derived and stored in the DOM prior to receiving the request for the first page in response to determining that the probability that the first page will be requested is high.

14. The method of claim 8, wherein the DOM defines the relative structure associated with the first page and the second page according to one or more common nodes that store at least the static portion corresponding to the one or more common elements shared among the different pages, the first dynamic portion unique to the first page, and the second dynamic portion unique to the second page.

15. The method of claim 14, wherein the first page and the second page share the one or more common nodes, and wherein the first dynamic portion stored in each common node for the first page differs from the second dynamic portion stored in each common node for the second page.

16. The method of claim 14, wherein the DOM further comprises at least one unique node that stores one of the first dynamic portion unique to the first page or the second dynamic portion unique to the second page.

17. The method of claim 16, wherein the DOM arranges the one or more common nodes and the at least one unique node according to the hierarchy to represent child-parent relationships among the static portion corresponding to the one or more common elements shared among the different pages, the first dynamic portion unique to the first page, and the second dynamic portion unique to the second page.

18. The method of claim 17, wherein the DOM further arranges the one or more common nodes and the at least one unique node according to the hierarchy to identify all of the respective nodes for the first page and the second page and the respective child-parent relationships among all of the respective nodes for the first page and the second page.

19. The method of claim 1, further comprising:
removing one or more of the first dynamic portion unique to the first page or the second dynamic portion unique to the second page from the DOM on an existing walk through the DOM on navigating back to the respective page.

20. The method of claim 1, further comprising:
retrieving a second static portion associated with the second page from the server and creating a static DOM based on the second static portion in response to the structure associated with the second page not matching the relative structure associated with the first page as defined in the DOM stored in the memory; and
storing the static DOM in the memory for later use.

21. The method of claim 1, wherein the first page comprises a manifest that includes the second page among one or more pages that are reachable from the first page such that the transitioning to the second page comprises moving from the first page to the second page.

22. A computer device configured to render pages, the computer device comprising:
a memory; and
at least one processor, coupled to the memory, and configured to:
fetch a first page;
store a document object model (DOM) shared among different pages in the memory, wherein the DOM stored in the memory defines a relative structure associated with the first page, and wherein the DOM comprises a static portion corresponding to one or more common elements shared among the different pages and a first dynamic portion unique to the first page;
transition to a second page;
retrieve only dynamic data corresponding to a second dynamic portion unique to the second page from a server in response to the second page having a structure similar to the relative structure associated with the first page as defined in the DOM shared among the different pages;
create the second dynamic portion unique to the second page based on the dynamic data retrieved from the server;
update the DOM stored in the memory to include the second dynamic portion unique to the second page such that the static portion in the updated DOM is shared among the first page and the second page and defines a relationship between the static portion corresponding to the one or more common elements shared among to the different pages, the first dynamic portion unique to the first page, and the second dynamic portion unique to the second page; and
render the second page according to at least the relationship defined in the DOM between the static portion corresponding to the one or more common elements shared among the different pages and the second dynamic portion unique to the second page.

23. The computer device of claim 22, wherein:
the DOM represents the relative structure associated with the first page and the second page and the relationship between the static portion corresponding to the one or more common elements shared among the different pages, the first dynamic portion unique to the first page, and the second dynamic portion unique to the second page according to a hierarchy, and
the at least one processor is further configured to:
determine that the hierarchy represents a relationship between the first page and one or more adjacent pages;
determine a probability that the first page will be requested based on the relationship between the first page and the one or more adjacent pages; and
pre-derive and store the static portion corresponding to the one or more common elements shared among the different pages in the DOM prior to receiving a request for the first page in response to determining that the probability that the first page will be requested is high.

24. A non-transitory computer-readable storage medium comprising computer-executable instructions for efficient page rendering on a computer device, wherein executing the computer-executable instructions on the computer device causes the computer device to:
fetch a first page;
store a document object model (DOM) shared among different pages in a memory at the computer device, wherein the DOM stored in the memory defines a relative structure associated with the first page, and wherein the DOM comprises a static portion corresponding to one or more common elements shared among the different pages and a first dynamic portion unique to the first page;
transition to a second page;
retrieve only dynamic data corresponding to a second dynamic portion unique to the second page from a server in response to the second page having a structure similar to the relative structure associated with the first page as defined in the DOM shared among the different pages;
create the second dynamic portion unique to the second page based on the dynamic data retrieved from the server;
update the DOM stored in the memory to include the second dynamic portion unique to the second page such that the static portion in the updated DOM is shared among the first page and the second page and defines a relationship between the static portion corresponding to the one or more common elements shared among the different pages, the first dynamic portion unique to the first page, and the second dynamic portion unique to the second page; and
render the second page according to at least the relationship defined in the DOM between the static portion corresponding to the one or more common elements shared among the different pages and the second dynamic portion unique to the second page.

25. The non-transitory computer-readable storage medium of claim 24, wherein the DOM represents the relative structure associated with the first page and the second page and the relationship between the static portion corresponding to the one or more common elements shared among the different pages, the first dynamic portion unique to the first page, and the second dynamic portion unique to the second page according to a hierarchy, and wherein executing the computer-executable instructions on the computer device further causes the computer device to:
determine that the hierarchy represents a relationship between the first page and one or more adjacent pages;
determine a probability that the first page will be requested based on the relationship between the first page and the one or more adjacent pages; and pre-derive and store the static portion corresponding to the one or more common elements shared among the different pages in the DOM prior to receiving a request for the first page in response to the probability that the first page will be requested being high.

26. An apparatus, comprising:
means for fetching a first page;
means for storing a document object model (DOM) shared among different pages, wherein the DOM defines a relative structure associated with the first page, and wherein the DOM comprises a static portion corresponding to one or more common elements shared among the different pages and a first dynamic portion unique to the first page;
means for transitioning to a second page;
means for retrieving only dynamic data corresponding to a second dynamic portion unique to the second page from a server in response to the second page having a structure similar to the relative structure associated with the first page as defined in the DOM shared among the different pages;
means for creating the second dynamic portion unique to the second page based on the dynamic data retrieved from the server;
means for updating the DOM, wherein the updated DOM includes the second dynamic portion unique to the second page such that the static portion is shared among the first page and the second page, and wherein the updated DOM further defines a relationship between the static portion corresponding to the one or more common elements shared among the different pages, the first dynamic portion unique to the first page, and the second dynamic portion unique to the second page; and
means for rendering the second page according to at least the relationship defined in the DOM between the static portion corresponding to the one or more common elements shared among the different pages and the second dynamic portion unique to the second page.

27. The apparatus of claim 26, wherein the DOM represents the relative structure associated with the first page and the second page and the relationship between the static portion corresponding to the one or more common elements shared among the different pages, the first dynamic portion unique to the first page, and the second dynamic portion unique to the second page according to a hierarchy, and wherein the apparatus further comprises:
means for determining that the hierarchy represents a relationship between the first page and one or more adjacent pages;
means for determining a probability that the first page will be requested based on the relationship between the first page and the one or more adjacent pages; and
means for pre-deriving and storing the static portion corresponding to the one or more common elements shared among the different pages in the DOM prior to receiving a request for the first page in response to the probability that the first page will be requested being high.

28. An apparatus for efficient page rendering on a computer device, comprising:
a portal component configured to receive a first request for a first page; and
a web component configured to:
fetch the first page;
store a document object model (DOM) shared among different pages in a memory at the apparatus, wherein the DOM stored in the memory defines a relative structure associated with the first page, and wherein the DOM comprises a static portion corresponding to one or more common elements shared among the different pages and a first dynamic portion unique to the first page;
transition to a second page in response to a second request received at the portal component;
retrieve only dynamic data corresponding to a second dynamic portion unique to the second page from a server in response to the second page having a structure similar to the relative structure associated with the first page as defined in the DOM shared among the different pages;
create the second dynamic portion unique to the second page based on the dynamic data retrieved from the server; and
update the DOM stored in the memory to include the second dynamic portion unique to the second page such that the static portion in the updated DOM is shared among the first page and the second page and defines a relationship between the static portion corresponding to the one or more common elements shared among the different pages, the first dynamic portion unique to the first page, and the second dynamic portion unique to the second page; and
a rendering component configured to render the second page according to at least the relationship defined in the DOM between the static portion corresponding to the one or more common elements shared among the different pages and the second dynamic portion unique to the second page.

29. The apparatus of claim 28, wherein the rendering component is further configured to render the second page according to the relative structure associated with the first page as defined in the DOM.

30. The apparatus of claim 29, wherein the rendering component is further configured to reuse the static portion corresponding to the one or more common elements shared among the different pages and process the second dynamic portion unique to the second page to render the second page.

31. The apparatus of claim 28, further comprising:
a local cache configured to store raw content received through the portal component; and
a content handler configured to:
generate derivative content from at least a portion of the received raw content in response to a determination that at least the portion of the received raw content triggers derivative processing;
associate the derivative content with at least the portion of the received raw content used to generate the derivative content; and
store the derivative content in the local cache.

32. The apparatus of claim 31, further comprising:
a content handler component configured to receive processing instructions with the raw content and apply the processing instructions to determine whether at least the portion of the received raw content triggers the derivative processing,
wherein the content handler is further configured to use the processing instructions to process at least the portion of the received raw content to generate the derivative content.

33. The apparatus of claim 28, further comprising:
a local cache configured to store semantically opaque content received through the portal component; and
a content handler configured to store at least a portion of the semantically opaque content in a structured cache according to a known structure that allows for portions of the stored semantically opaque content to be selectively retrieved through a defined formulation.

34. The apparatus of claim 28, wherein the portal component is further configured to receive the second request for the second page, wherein the first request and the second request each comprise a first portion to define a location for the respective page and a second portion to define the dynamic data to retrieve for the respective page.

35. The apparatus of claim 28, wherein the DOM represents the relative structure associated with the first page and the second page and the relationship between the static portion corresponding to the one or more common elements shared among the different pages, the first dynamic portion unique to the first page, and the second dynamic portion unique to the second page according to a hierarchy.

36. The apparatus of claim 35, further comprising a derivation manager component configured to pre-derive and store the static portion corresponding to the one or more common elements shared among the different pages in the DOM prior to the first request for the first page.

37. The apparatus of claim 36, wherein the derivation manager component is further configured to:
 parse content from the first page to create the DOM; and
 apply one or more rules to the DOM to create the static portion corresponding to the one or more common elements shared among the different pages.

38. The apparatus of claim 36, wherein the derivation manager component is further configured to:
 determine that the hierarchy represents a relationship between the first page and one or more adjacent pages; and
 determine a probability that the first page will be requested based on the relationship between the first page and the one or more adjacent pages, wherein the static portion corresponding to the one or more common elements shared among the different pages is pre-derived and stored in the DOM prior to receiving the first request for the first page in response to the probability that the first page will be requested being high.

39. The apparatus of claim 35, wherein the DOM defines the relative structure associated with the first page and the second page according to one or more common nodes that store at least the static portion corresponding to the one or more common elements shared among the different pages, the first dynamic portion unique to the first page, and the second dynamic portion unique to the second page.

40. The apparatus of claim 39, wherein the first page and the second page share the one or more common nodes, and wherein the first dynamic portion stored in each common node for the first page differs from the second dynamic portion stored in each common node for the second page.

41. The apparatus of claim 39, wherein the DOM further comprises at least one unique node that stores one of the first dynamic portion unique to the first page or the second dynamic portion unique to the second page.

42. The apparatus of claim 41, wherein the DOM arranges the one or more common nodes and the at least one unique node according to the hierarchy to represent child-parent relationships among the static portion corresponding to the one or more common elements shared among the different pages, the first dynamic portion unique to the first page, and the second dynamic portion unique to the second page.

43. The apparatus of claim 42, wherein the DOM further arranges the one or more common nodes and the at least one unique node according to the hierarchy to identify all of the respective nodes for the of first page and the second page and the respective child-parent relationships among all of the respective nodes for the first page and the second page.

44. The apparatus of claim 28, further comprising a fetch manager component configured to pre-fetch content from the second page prior to the transition to the second page.

45. The apparatus of claim 44, wherein the fetch manager component is further configured to use one or more algorithms to determine relationships between the first page and one or more adjacent pages and to determine the content to pre-fetch from the second page based on the one or more adjacent pages including the second page.

46. The apparatus of claim 28, wherein the web component is further configured to:
 remove one or more of the first dynamic portion unique to the first page or the second dynamic portion unique to the second page from the DOM on an existing walk through the DOM on navigating back to the respective page.

47. The apparatus of claim 28, wherein the web component is further configured to:
 retrieve a second static portion associated with the second page from the server and creating a static DOM based on the second static portion in response to the structure associated with the second page not matching the relative structure associated with the first page as defined in the DOM stored in the memory; and
 store the static DOM in the memory for later use.

* * * * *